US00RE35998E

United States Patent [19]

Goto

[11] E Patent Number: Re. 35,998

[45] Reissued Date of Patent: Dec. 22, 1998

[54] ELECTRIC COOKING APPARATUS

[75] Inventor: Hisashi Goto, Kakamigahara, Japan

[73] Assignee: Alco Kogyo Kabushiki Kaisha, Japan

[21] Appl. No.: 828,516

[22] Filed: Mar. 31, 1997

Related U.S. Patent Documents

Reissue of:

[64] Patent No.: 5,546,851
Issued: Aug. 20, 1996
Appl. No.: 364,153
Filed: Dec. 27, 1994

[30] Foreign Application Priority Data

Dec. 27, 1993 [JP] Japan ..... 5-350791
Nov. 10, 1994 [JP] Japan ..... 6-302853

[51] Int. Cl.[6] ..... A47J 27/00

[52] U.S. Cl. ..... 99/446; 99/450

[58] Field of Search ..... 99/400, 444, 446, 99/450; 219/443, 455, 432, 433, 385, 387

[56] References Cited

U.S. PATENT DOCUMENTS

| | | | |
|---|---|---|---|
| 3,757,671 | 9/1973 | Warshauer et al. | 99/400 |
| 4,662,273 | 5/1987 | Marchioni | 99/446 |
| 4,862,795 | 9/1989 | Hawkins | 99/444 |
| 4,909,137 | 3/1990 | Brugnoli | 99/400 |
| 4,917,006 | 4/1990 | Bowen et al. | 99/446 |
| 5,176,067 | 1/1993 | Higgins | 99/446 |
| 5,355,779 | 10/1994 | O'Brien et al. | 99/446 |

FOREIGN PATENT DOCUMENTS

| | | |
|---|---|---|
| 0545256 | 3/1979 | Japan . |
| 1108226 | 7/1989 | Japan . |

*Primary Examiner*—Reginald L. Alexander
*Attorney, Agent, or Firm*—Morrison Law Firm

[57] ABSTRACT

A cooking apparatus includes a container, a cooking plate above the container, and a receiving pan between the container and cooking plate. The cooking plate includes an electric heating element. A plurality of drip holes in the cooking plate allows cooking juices to drain from the cooking plate during cooking. The receiving pan supports the cooking plate and catches the juices to permit easy clean-up after cooking. The container supports the receiving pan and insulates both the cooking plate and receiving pan from a table or countertop surface.

16 Claims, 26 Drawing Sheets

ELECTRIC COOKING APPARATUS

Matter enclosed in heavy brackets [ ] appears in the original patent but forms no part of this reissue specification; matter printed in italics indicates the additions made by reissue.

BACKGROUND OF THE INVENTION

This invention relates to an electric cooking apparatus using an electric heating element.

An electric cooking apparatus, such as a frying pan, hot plate, or griddle, conventionally heats its cooking plate using a heating element such as a sheath heater or a tubular element. The cooking plate is heated by heat produced by electric energy passing through a high resistance. Items to be cooked, such as meat and vegetables, are placed directly on the cooking plate. As the food cooks, however, cooking juices are produced during the cooking process, and the food cooks in its own juices. In addition, as the juices boil away or evaporate, the residue clings to the food being cooked. This residue affects the appearance and taste of the food.

Broiling and grilling cooking methods overcome this problem by separating the heat source from the food. A broiling pan in an oven/broiler combination contains a drip pan that allows the cooking juices to drip to a lower section away from the food being broiled. When grilling food over a heat source, the cooking juices drip directly onto the heat source, as in an outdoor gas grill or an indoor electric grill.

OBJECTS AND SUMMARY OF THE INVENTION

Accordingly, it is an object of the invention to overcome the limitations and drawbacks of the prior art.

It is an object of this invention to provide an electric cooking apparatus which drains cooking juices during cooking.

It is also an object of this invention to provide a cooking apparatus that is easily portable.

It is a further object of this invention to provide such a cooking apparatus which is easy to manufacture.

Briefly stated, a cooking apparatus includes a container, a cooking plate above the container, and a receiving pan between the container and cooking plate. The cooking plate includes an electric heating element. A plurality of drip holes in the cooking plate allows cooking juices to drain from the cooking plate during cooking. The receiving pan supports the cooking plate and catches the juices to permit easy clean-up after cooking. The container supports the receiving pan and insulates both the cooking plate and receiving pan from a table or countertop surface.

According to an embodiment of the invention, a cooking apparatus includes a cooking plate, a heating element attached to the cooking plate for heating the cooking plate, a plurality of drip holes in the cooking plate, a first container disposed below the cooking plate for supporting the cooking plate and for receiving a fluid dripping through the drip holes, and a second container disposed below the first container for supporting the first container.

According to another embodiment of the invention, a cooking apparatus includes a cooking plate, a heating element attached to the cooking plate for applying heat to the cooking plate, a plurality of drip holes formed in the cooking plate, and a container disposed below the cooking plate for supporting the cooking plate and for receiving a fluid dripping through the drip holes.

According to another embodiment of the invention, a cooking apparatus includes a cooking plate having a plurality of drip holes, means for heating the cooking plate, means for supporting the cooking apparatus on a work surface, means for receiving a fluid dripping from the drip holes, and means for insulating the receiving means from the work surface.

According to an embodiment of the invention, a cooking apparatus includes a cooking plate having a plurality of drip holes therein, a plurality of projections on an upper side of the cooking plate, means for heating the cooking plate, a plurality of legs on the cooking plate, a socket attached to the cooking plate, a first container disposed below the cooking plate, the first container being substantially similar in shape and size to the cooking plate, a side wall of the first container having a first curved portion for permitting a hand of a user to fit therein, a plurality of supports on the first container, the plurality of supports having a plurality of recesses for receiving the plurality of legs on the cooking plate, a second container disposed below the first container, the second container being substantially similar in shape and larger in size than the first container, the second container having an attachment opening for receiving the socket, a side wall of the second container having a second curved portion for permitting the hand of the user to fit therein, a plurality of bosses in the second container having a plurality of heat-resistant tips for supporting the first container, and at least one ventilating hole in the second container.

According to an embodiment of the invention, a cooking apparatus includes a cooking plate having a plurality of drip holes therein, an upper face of each drip hole being gently inclined, a lower face of each drip hole being steeply inclined, means for heating the cooking plate, a plurality of projections on an upper side of the cooking plate, a plurality of legs on the cooking plate, a socket attached to the cooking plate, a first container disposed below the cooking plate, the first container being substantially similar in shape and size to the cooking plate, a side wall of the first container having a first curved portion for permitting a hand of a user to fit therein, a plurality of supports on the first container, the plurality of supports having a plurality of recesses for receiving the plurality of legs on the cooking plate, a second container disposed below the first container, the second container being substantially similar in shape and larger in size than the first container, the second container having an attachment opening for receiving the socket, the attachment opening having a plurality of recesses, the socket having a plurality of bosses for interlocking with the plurality of recesses in the attachment opening, a side wall of the second container having a second curved portion for permitting the hand of the user to fit therein, a plurality of ribs on a surface of the second container, a plurality of bosses in the second container having a plurality of heat-resistant tips for supporting the first container, and at least one ventilating hole in the second container.

According to an embodiment of the invention, a cooking apparatus includes a cooking plate having a plurality of drip holes, a plurality of ridges surrounding the drip holes means for heating the cooking plate, a socket attached to the cooking plate, a plurality of legs on the cooking plate, a one-piece container disposed under the cooking plate, the container having a container wall and a container bottom, a plurality of supports on the container bottom, a plurality of recesses in the plurality of supports for receiving the plurality of legs of the cooking plate, a heat-resistant synthetic resin in each of the recesses, the container wall having an attachment opening for receiving the socket, a plurality of feet on an underside of the container bottom, and at least one ventilating hole in the container wall.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
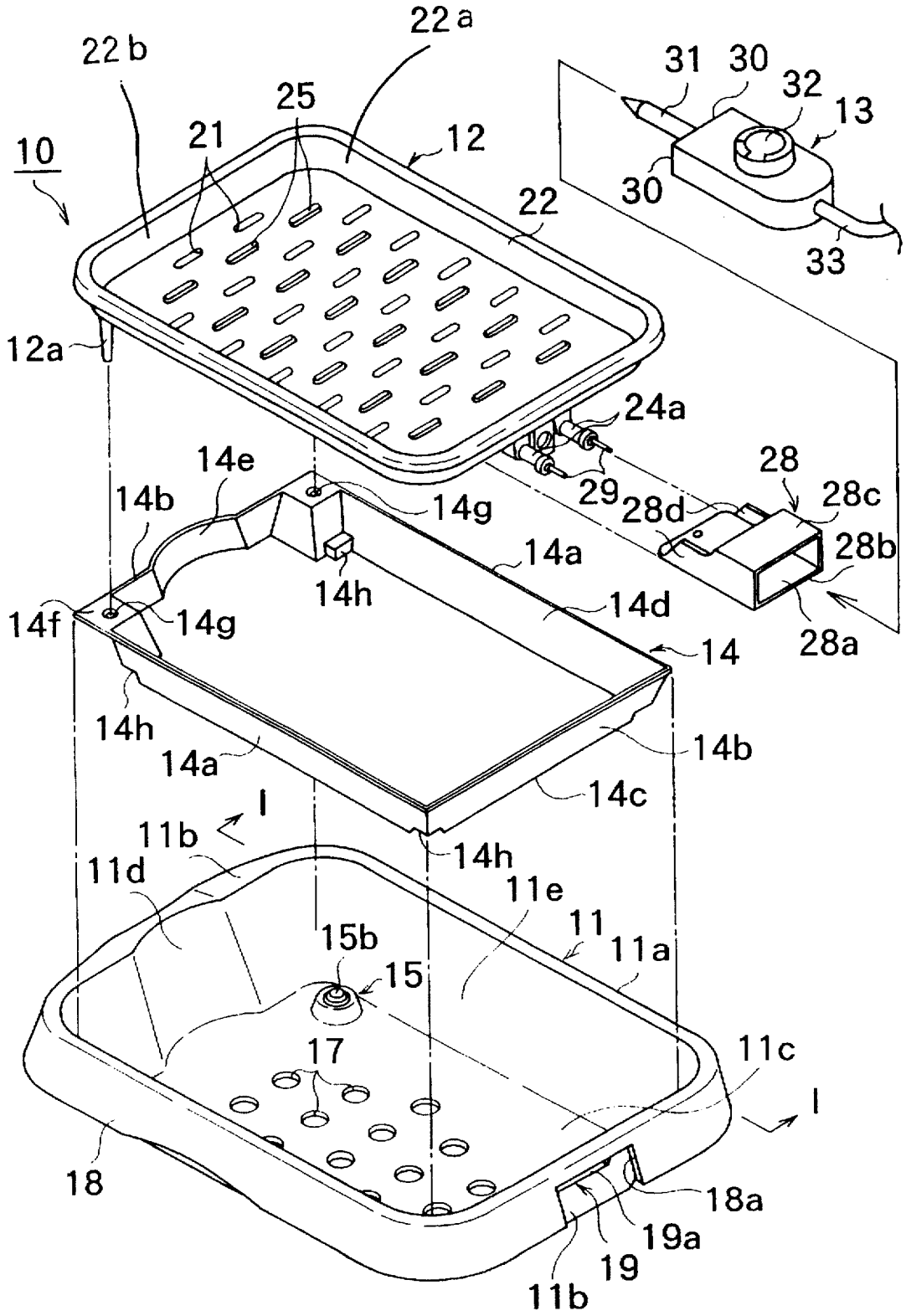
FIG. 1 is an exploded perspective view showing a cooking apparatus according to a first embodiment of the invention.

Referring to FIGS. 1–4, a cooking apparatus 10 includes a cooking plate 12 insertable in a receiving pan 14 which in turn rests in a container 11. Container 11 contains and supports cooking plate 12 with receiving pan 14 below cooking plate 12 to receive juices during cooking. Container 11 is approximately rectangular and includes opposing long side walls 11a, opposing short side walls 11b, and a bottom 11c continuous therewith. Container 11 is preferably one piece or integrally formed of a synthetic resin, but can be made of metal or ceramic. Container 11 may be circular, oval, or other geometric shape.

A plurality of bosses 15 on a bottom 11c of container 11 support a bottom 14c of receiving pan 14 from the lower side, thereby securely holding receiving pan 14 in a designated position. Preferably, bosses 15 are positioned at the four corners of bottom 11c, but any balanced arrangement will suffice. A tip 15b on each boss 15 fits into a corresponding recess 14h in bottom 14c so that receiving pan 14 stably mounts on container 11.

Figure 2:
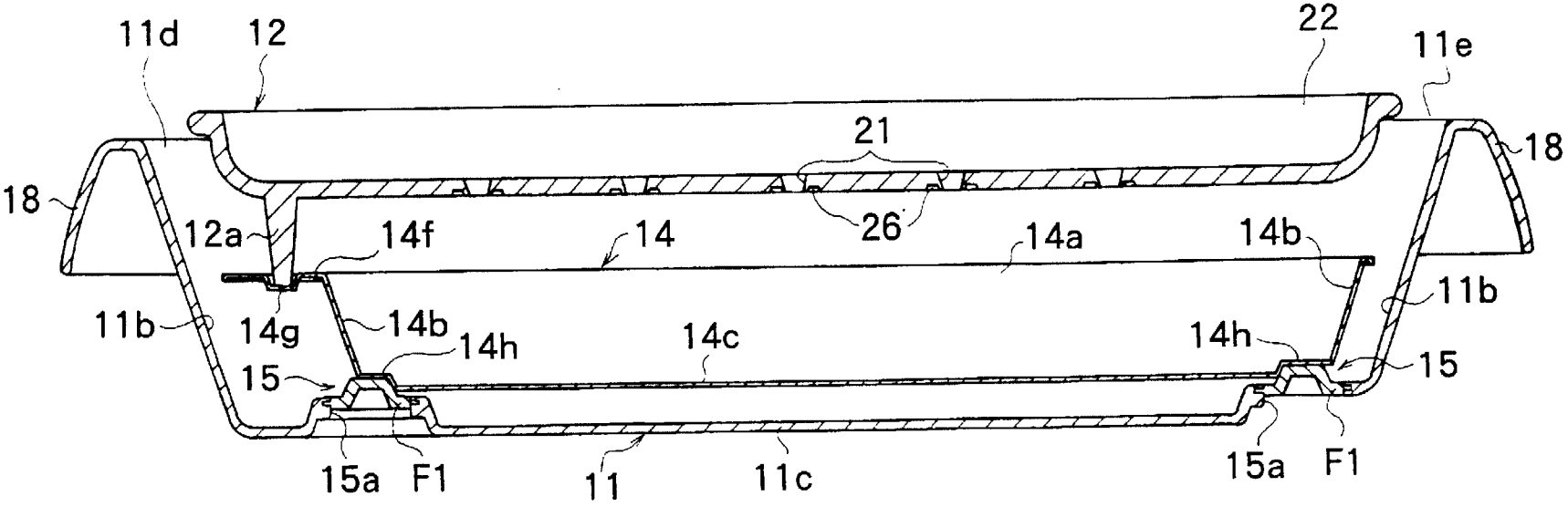
FIG. 2 is a vertical cross-sectional view along the I—I line in FIG. 1, showing the assembled cooking apparatus.

In this embodiment, each boss 15 is formed by inserting a heat-resistant synthetic resin F1, such as a heat-resistant phenol resin, into a hole 15a as shown in FIG. 2. Bosses 15 insulate bottom 11c from heat conducted by cooking plate 12 and receiving pan 14.

Figure 3:
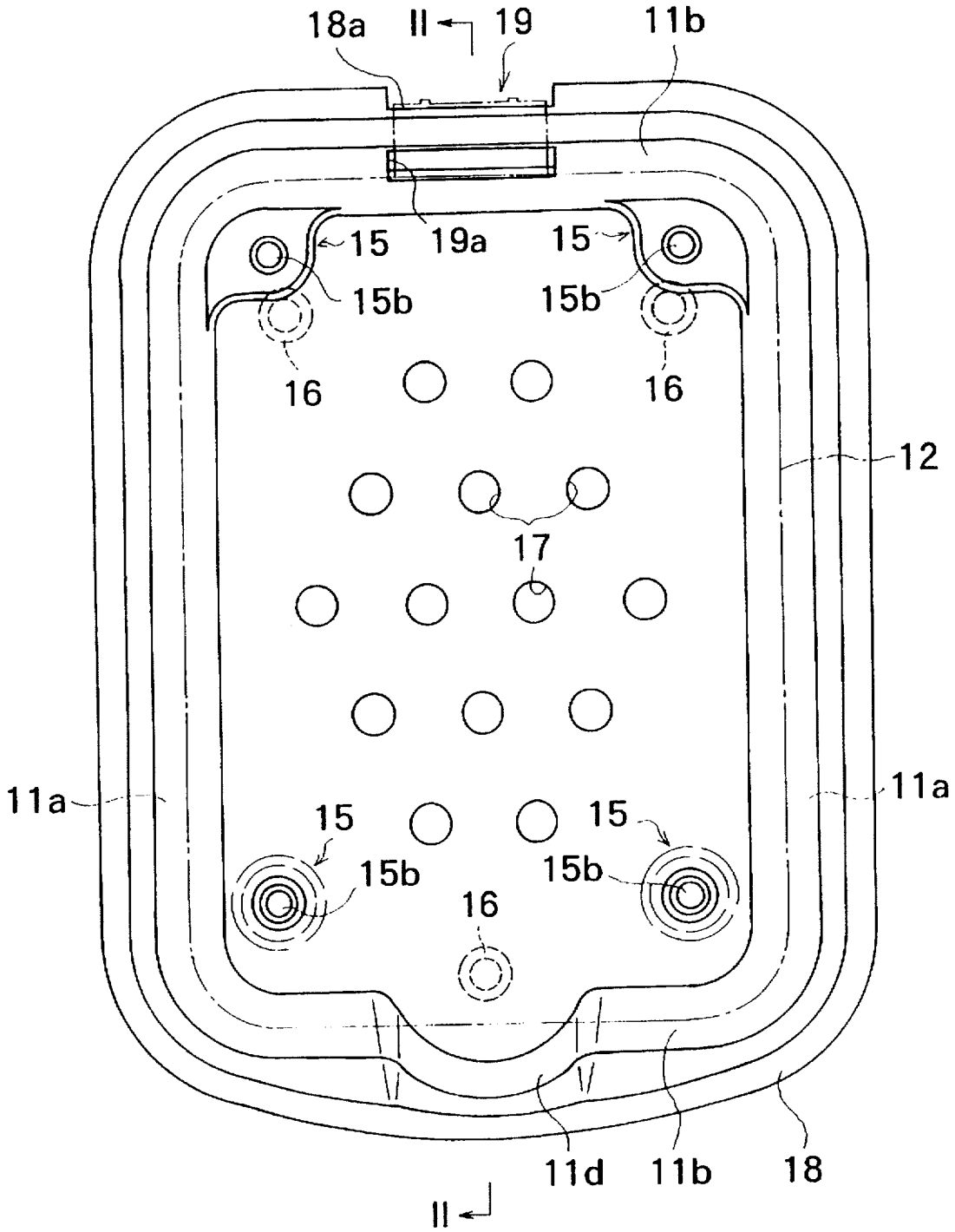
FIG. 3 is a top plan view showing a container used in the cooking apparatus according to the first embodiment.
Figure 4:
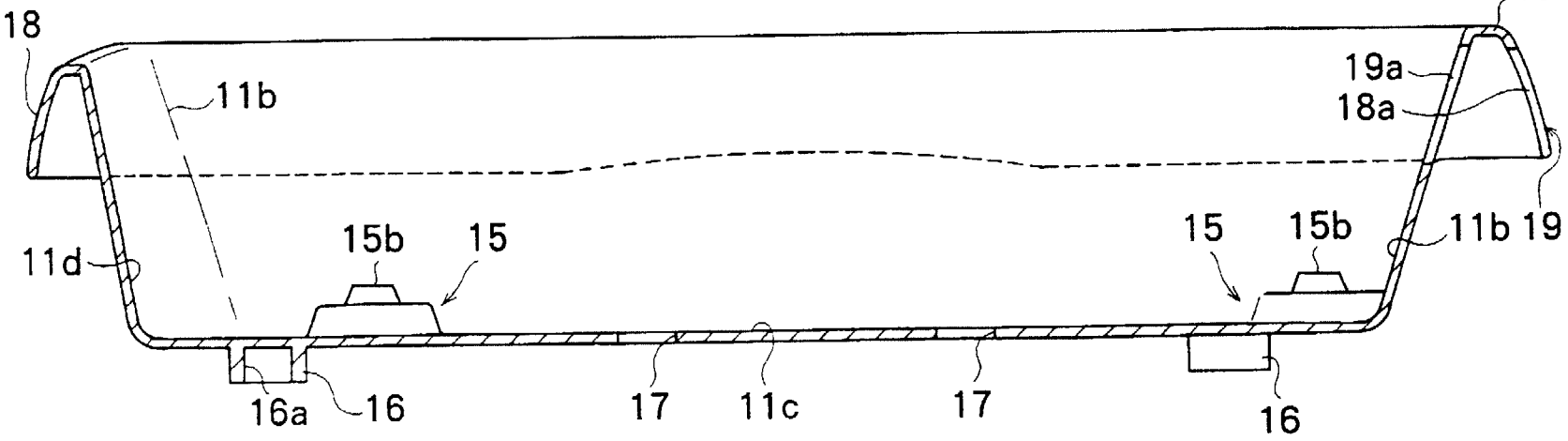
FIG. 4 is a vertical cross-sectional view along the II—II line in FIG. 3 of the container used in the cooking apparatus according to the first embodiment.

A plurality of feet 16 on an underside of bottom 11c of container 11 create a space between bottom 11c and a surface of a table or other work surface (not shown) upon which cooking apparatus 10 rests. Hereinafter, the surface of the table or other related work surfaces is abbreviated as simply a work surface. Each foot 16 has a recess 16a on an inside of a lower end for receiving an antiskid rubber foot (not shown). Three feet 16, as shown in FIG. 3, are arranged at three locations on the underside of bottom 11c. Two of feet 16 are located near bosses 15 near one side wall 11b, while the other foot 16 is located between two bosses 15 on an opposite side. Having three feet 16 arranged in triangular fashion stably supports cooking apparatus 10 on the table or other work surface.

A plurality of ventilating through holes 17 in the bottom 11c of container 11 allow air to flow into container 11, thus preventing container 11 from overheating. In addition, container 11 is sized so that an air space between cooking plate 12 and side walls 11a, 11b allows hot air in container 11 to flow upward through the air space between the outside of cooking plate 12 and the inside of container 11.

Long side walls 11a and short side walls 11b are inclined so that a cross-sectional area of container 11 is wider at the top than at the bottom. A curved portion 11d in container 11 extending outward on one of side walls 11b allows a hand of a user to fit easily therein, thereby enabling easy insertion and removal of receiving pan 14 and cooking plate 12. An apron 18, formed by folding an upper edge of side walls 11a, 11b outwardly downward, helps the user pick up cooking apparatus 10. An attachment opening 19a, passing through an other of side walls 11b, and an aligned attachment opening 18a in apron 18, together form an attachment opening 19 for receiving a socket 28.

Receiving pan 14 is shaped approximately the same as container 11 with corresponding opposed long side walls 14a and opposed short side walls 14b. Side walls 14a, 14b of receiving pan 14 have sufficient height to retain a prescribed amount of water. Side walls 14a, 14b are inclined so that a cross-sectional area of receiving pan 14 is wider at a top than at bottom 14c. Side walls 14a, 14b can be vertical or inclined as long as juices dripping from cooking plate 12 are wholly contained within receiving pan 14.

Since receiving pan 14 is between cooking plate 12 and container 11, heat radiating downward from cooking plate 12 is blocked by receiving pan 14. Therefore, container 11 is shielded from the radiating heat. Receiving pan 14 is preferably made of a heat shielding material such as ceramic or metal, but can be made of any material that provides adequate heat shielding and can withstand operating temperatures.

Receiving pan 14 preferably retains a certain amount of water during use, and preferably has a marker line (not shown) located on side walls 14a, 14b to indicate a recommended minimum amount of water or the like to be reservoired before use. Water reservoired in receiving pan 14 acts as a heat sink preventing receiving pan 14 from overheating and also prevents juices dripping from cooking plate 12 from sticking onto bottom 14c. Easy cleanup after cooking is thus facilitated.

An outwardly curved portion 14e on one of side walls 14b allows the hand of the user to fit easily therein, thereby enabling inserting and removing cooking plate 12. Curved portion 14e fits into curved portion 11d of container 11 but allows the fingers of the user to fit between it and container 11. Since curved portion 14d extends outward beyond a side of cooking plate 12, the user can easily look at bottom 14c of receiving pan 14 to determine if the desired amount of water is present before cooking. Also, the interfitting of curved portion 14e and curved portion 11d guides the user in installing receiving pan 14 in the correct orientation.

Recesses 14h fit over tips 15b on bosses 15 of container 11 so that receiving pan 14 stably mounts on container 11. A plurality of supports 14f support feet 12a of cooking plate 12. Specifically, supports 14f are at both corners of the side wall 14b containing curved portion 14e. A recess 14g formed in each support 14f receives a lower end of foot 12a, thereby properly positioning cooking plate 12 on receiving pan 14. It is understood that alternate shapes are within the contemplation of the present invention, and that the embodiment pictured is not designed to be limiting.

Figure 5:
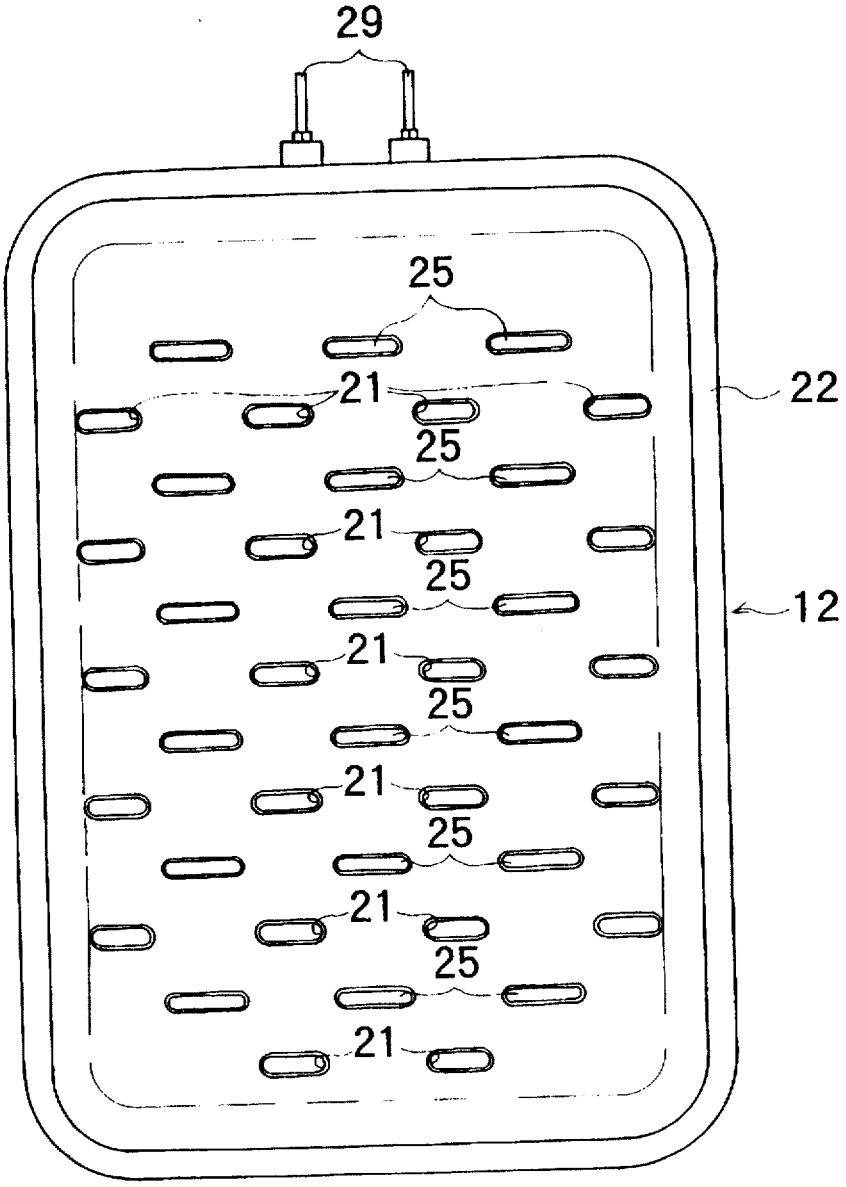
FIG. 5 is a top plan view showing a cooking plate used in the cooking apparatus according to the first embodiment.
Figure 6:
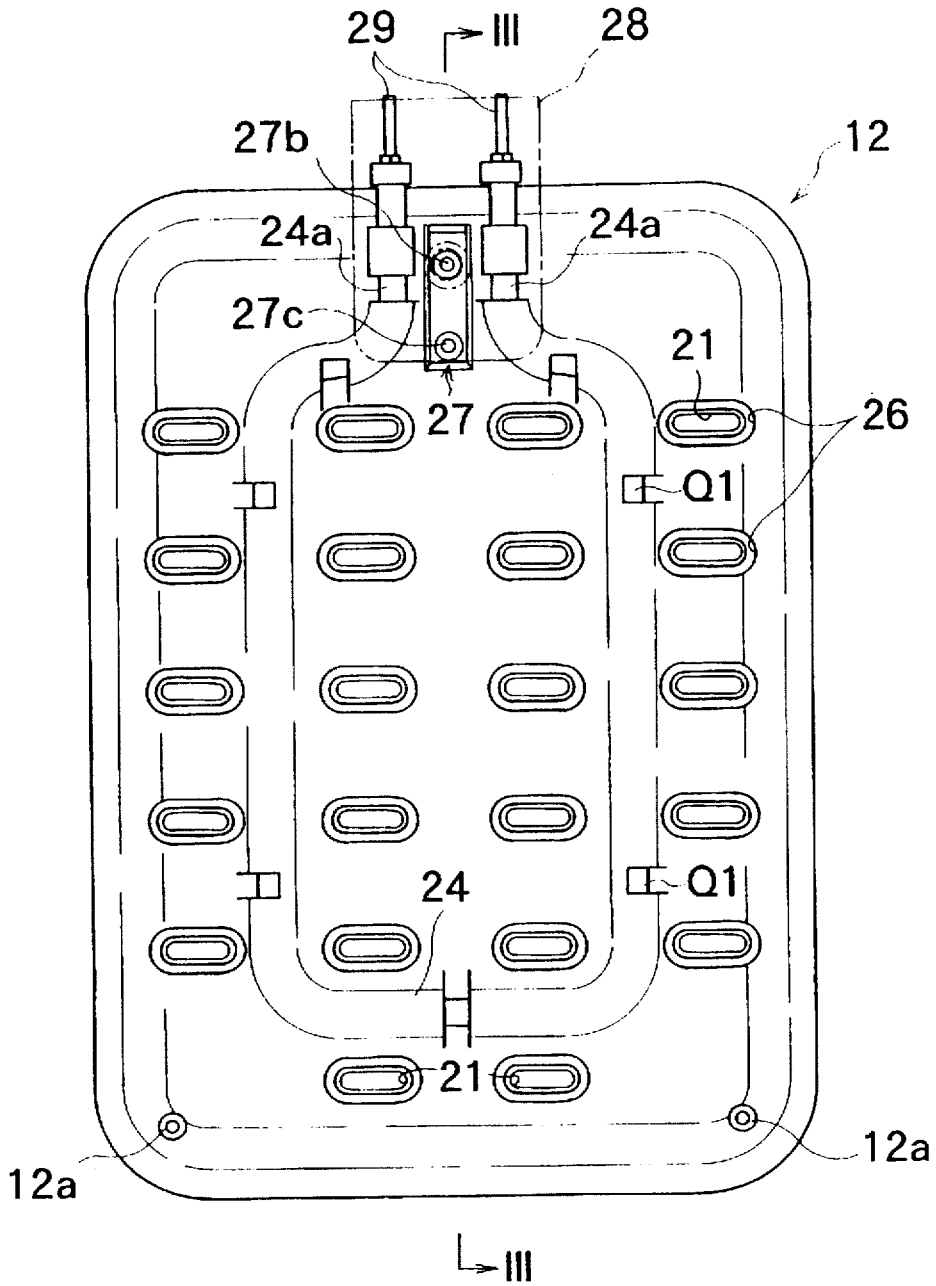
FIG. 6 is a bottom plan view of the cooking plate of FIG. 5.

Referring also to FIGS. 5–6, cooking plate 12 is shaped approximately the same as container 11 and receiving pan 14. A surrounding edge 22 prevents food from sliding off an upper surface of cooking plate 12. Two short edges 22b are substantially parallel to side walls 14b and side walls 11b. Two long edges 22a are substantially parallel to side walls 14a and side walls 11a. A heating element 24, such as, for example, a sheath heater, tubular element, or the like, is centered underneath cooking plate 12 and disposed so as to heat cooking plate 12 uniformly and evenly.

A plurality of drip holes 21 in cooking plate 12, positioned to avoid heating element 24, permit cooking juices to drip into receiving pan 14. In this embodiment, drip holes 21 are elliptically shaped with a length aligned with short edges 22b, but drip holes 21 may be any convenient shape and arranged in any pattern which avoids heating element 24. Drip holes 21 form parallel rows and columns spaced apart by a set amount. As best shown in FIG. 2, a cross-section of each drip hole 21 is wide at its top and narrow at its bottom to aid the cleaning process.

A plurality of projections 25 on an upper side of cooking plate 12 are interspersed with drip holes 21. Projections 25 impart a seared mark to pan fried foods. Projections 25, if high enough, can also raise the cooking food above the upper surface of cooking plate 12 to prevent contact with cooking juices. Specifically, these projections 25 are arrayed as to form plural rows with predetermined space between them along the shorter side wall of the cooking plate 12 and as to form plural columns along the longer side wall. Such projections may not be required to be formed when unnecessary.

A plurality of grooves 26 on an underside of cooking plate 12 surround drip holes 21. Grooves 26 surround drip holes 21 to prevent cooking juices from spreading along the lower surface of cooking plate 12. Each groove 26 is a little larger than the bottom side size of the hole 21 and extends in parallle with the shorter side wall of the cooking plate 12.

The upper surface of cooking plate 12 is preferably coated with a fluorine compound such as a polytetrafluoroethylene (PTFE). The fluorine compound acts as an abherent, preventing food from sticking during cooking and making cleaning after cooking easy. The bottom surface of cooking plate 12 is also preferably coated with the fluorine compound for the same reasons.

Heating element 24 includes two terminals 24a for connecting with a detachable control 13. Two connector pins 29, one at an end of each terminal 24a, fit into a pair of insertion holes 30 (not shown) formed on a front side of detachable control 13. An electric cord 33 for connecting a power source (not shown) enters a back side of detachable control 13 to connect with contacts in the pair of insertion holes 30. When connector pins 29 are inserted into insertion holes 30, heating element 24 and electrical metal fittings (not shown) in detachable control 13 are electrically connected. A sensor pin 31 for detecting a temperature of cooking plate 12 extends from a front face of detachable control 13 between the pair of insertion holes 30 to guide insertion of connector pins 29 into holes 30. A rotary knob 32 for controlling the temperature of heating element 24 is on a top face of detachable control 13.

Figure 7:
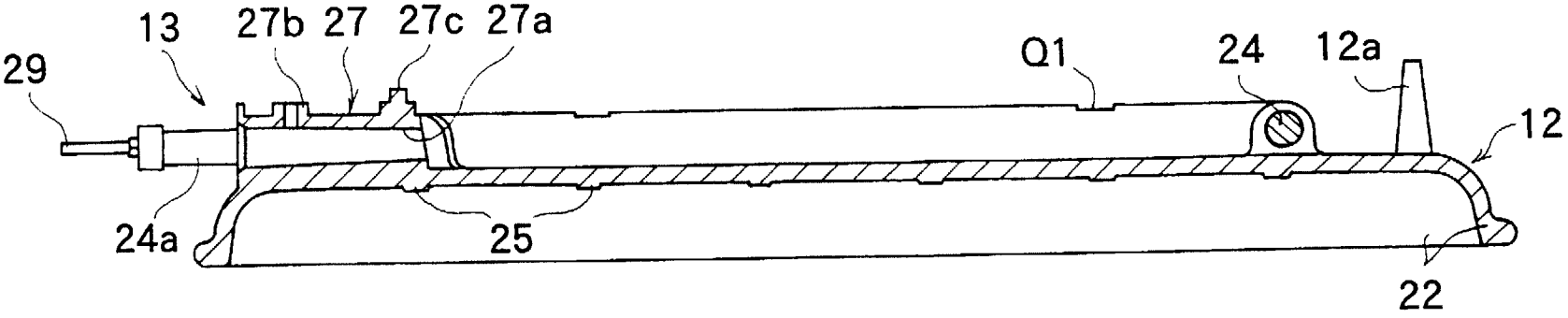
FIG. 7 is a vertical cross-sectional view along the III—III line in FIG. 6.
Figure 8:
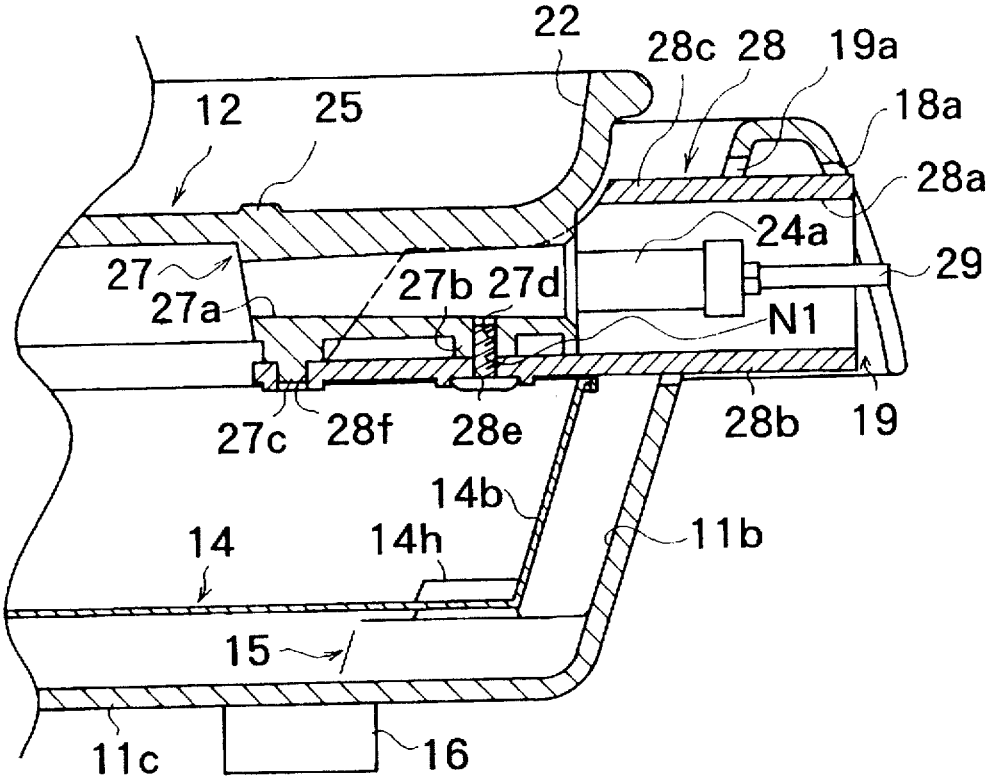
FIG. 8 is an enlarged cross-sectional view showing a socket attached to the cooking plate according to the first embodiment.
Figure 9:
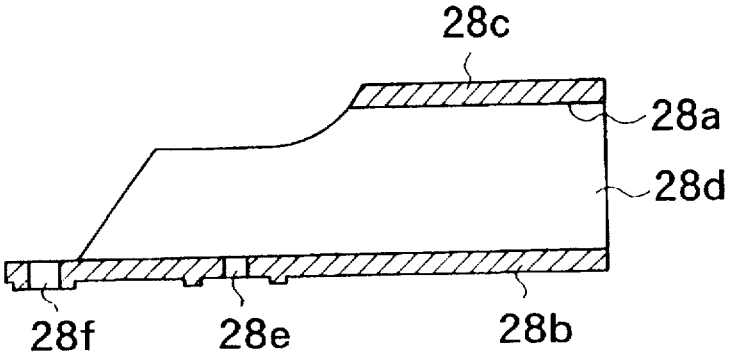
FIG. 9 is an enlarged cross-sectional view of the socket according to the first embodiment.
Figure 10:
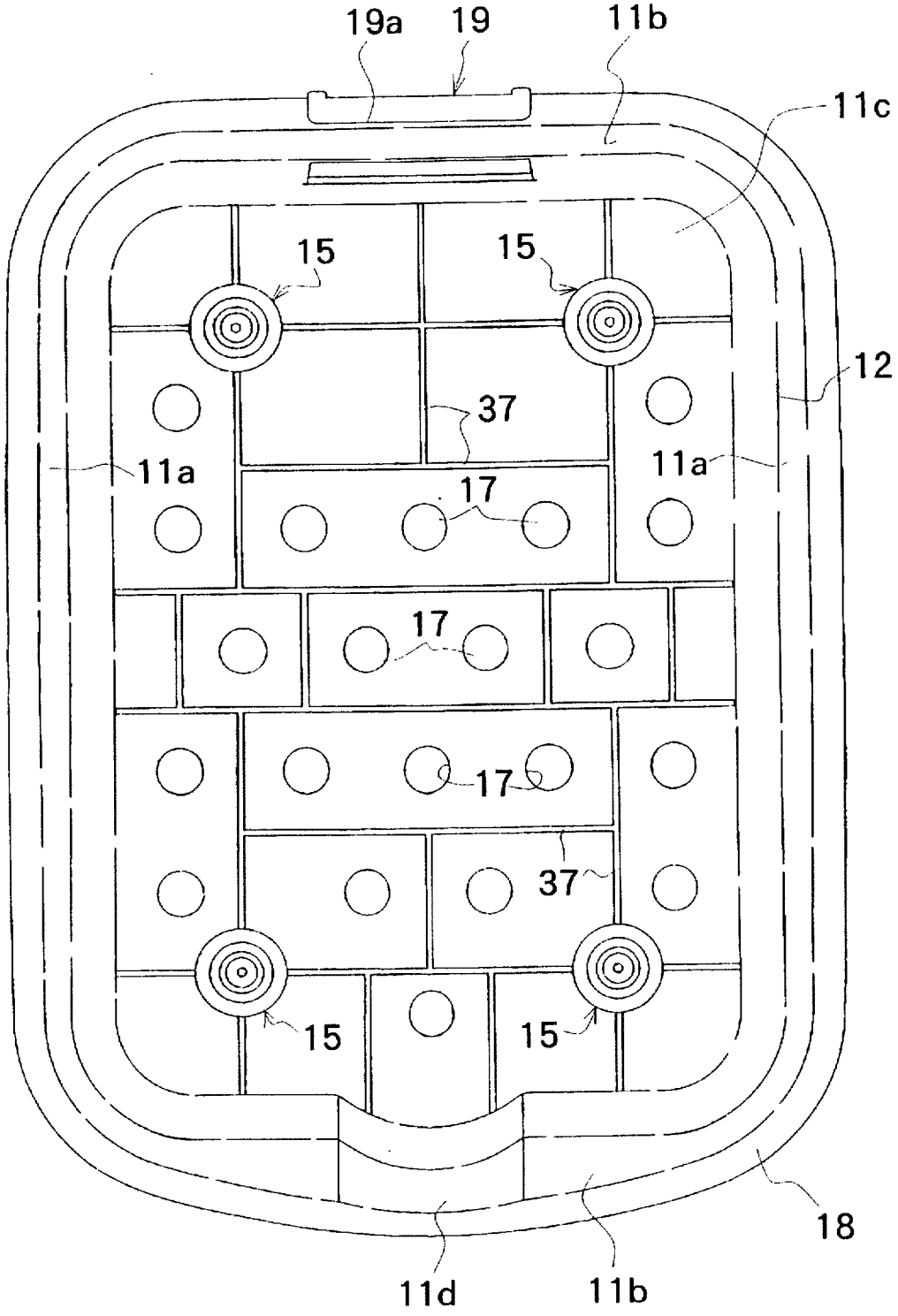
FIG. 10 is a top plan view of a container used in a cooking apparatus according to a second embodiment of the present invention.
Figure 11:
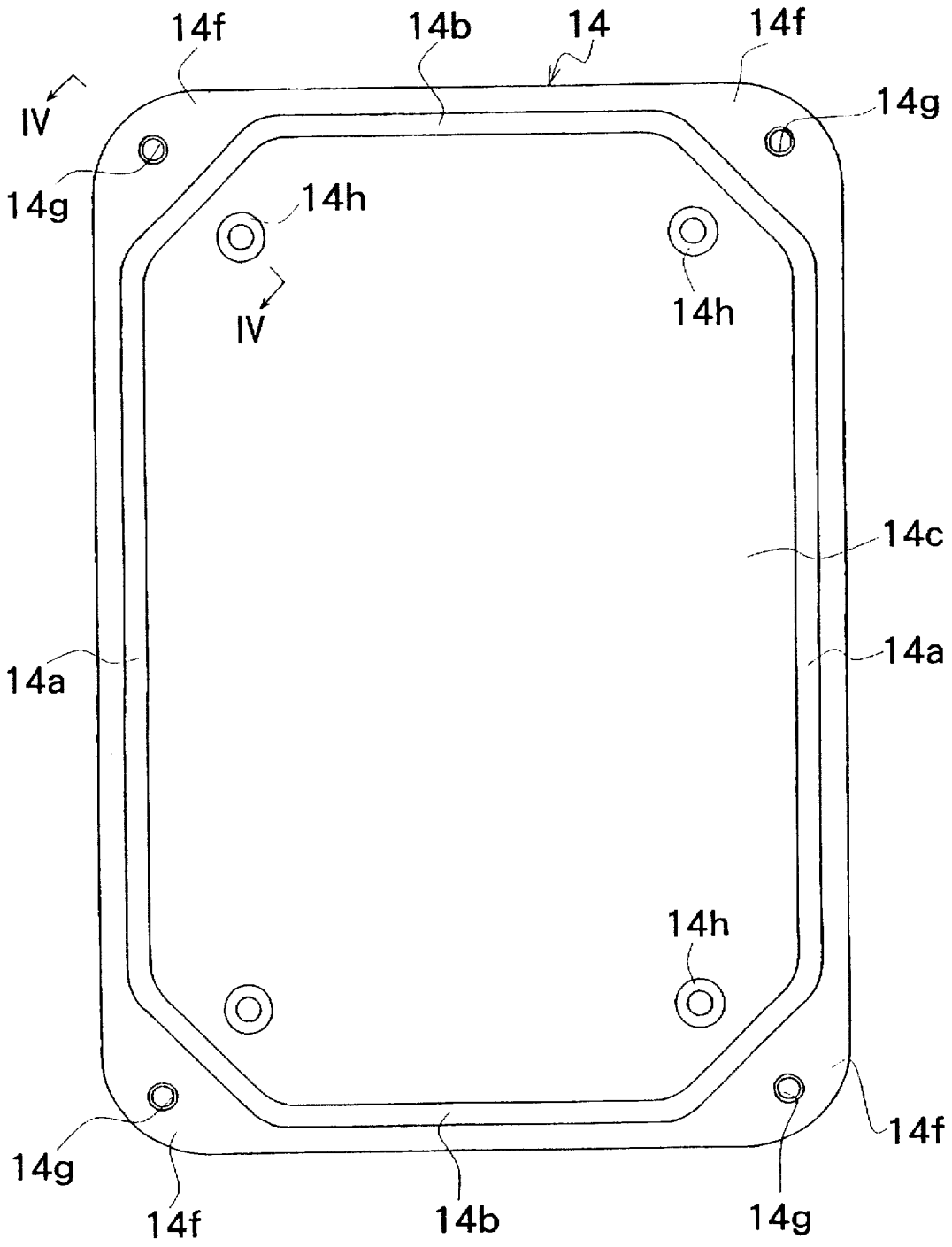
FIG. 11 is a top plan view of a receiving pan used in the cooking apparatus according to the second embodiment.
Figure 18:
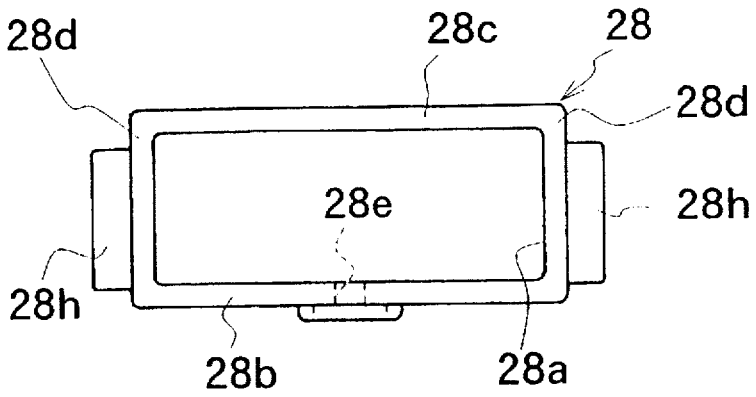
FIG. 18 is a front view of the socket attached to the cooking plate according to the second embodiment.
Figure 12:
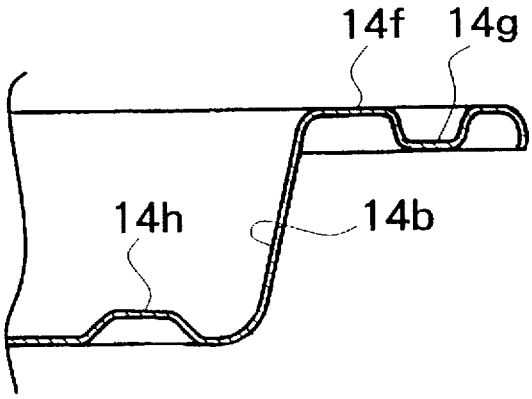
FIG. 12 is a vertical cross-sectional view along the IV—IV line in FIG. 11.

Referring also to FIGS. 7–9, an attachment base 27 between terminals 24a includes an insertion hole 27a for receiving sensor pin 31. Sensor pin 31 contacts an inner wall of insertion hole 27a when inserted to detect the temperature of cooking plate 12. Attachment base 27, extending inward from a side edge of cooking plate 12, connects socket 28 to cooking plate 12. Socket 28 includes an attachment opening 28a for receiving and guiding detachable control 13 on one end side portion 28b extending from the one end side to a bottom plate on the other end side. Socket 28 is made of ceramic or a heat-resistant synthetic resin such as a heat resistant phenol resin.

A top plate portion 28c located in opposed relation to the bottom plate portion 20b and two side plate portions 28d provided in opposed relation to the bottom plate portion 20b of socket 28 conform to a shape of cooking plate 12 at the connection site. A boss 27c on attachment base 27 corresponds to an attachment hole 28f on a bottom plate portion 28b. A boss 27b on attachment base 27 has a screw hole 27d which corresponds to an attachment hole 28e in bottom plate portion 28b. Socket 28 is affixed to cooking plate 12 by a screw N1 screwed into attachment base 27 via attachment hole 28e and screw hole 27d. The fitted connection of boss 27c and attachment hole 28f helps position and secure socket 28 to attachment base 27. Terminals 24a extend into attachment opening 28a for connecting with insertion holes 30 of detachable control 13.

Cooking plate 12 is fabricated by the following method. Cooking plate 12 is formed by a conventional process of casting a metal, such as aluminum or iron, in a mold (not shown). Heating element 24 is secured in the mold before casting using a plurality of jigs. A plurality of molds (not shown) for forming and determining the shape of drip holes 21 are arranged so that drip holes 21 and heating element 24 are separated. A jig trace Q1 in FIG. 6 shows a trace from a jig used to secure heating element 24 in the mold. Then molten metal is poured into the mold to form cooking plate 12. When the mold is removed, cooking plate 12 is formed with a buried heating element on the underside thereof. The upper and lower surfaces of cooking plate 12 are then coated with the fluorine compound. In this embodiment, cooking plate 12 and heating element 24 are covered by the fluorine compound to reduce sticking and to prevent rust. As a result, it is unnecessary to use a rust-resistant metal for cooking plate 12 or heating element 24. An inexpensive metal such as iron can therefore be used.

Cooking apparatus 10 on the work surface is used as follows. First, receiving pan 14 is placed in container 11 and mounted onto bosses 15. Second, cooking plate 12 is placed in receiving pan 14 ensuring that socket 28 is fined into attachment opening 19a and feet 12a are positioned in recesses 14g. Third, detachable control 13 is inserted into socket 28 so that connector pins 29 are in insertion holes 30 and sensor 31 is in insertion hole 27a. When cord 33 is connected to a power source (not shown), cooking apparatus 10 is ready for use.

Referring to FIGS. 10–19, a second embodiment of the present invention differs from the first embodiment mainly in the shapes of bottom 11c of container 11, attachment opening 19, socket 28, and receiving pan 14. Portions which differ from the first embodiment are described in detail whereas description of similar portions is omitted.

Referring to FIGS. 10–13 and 15, bottom 11c of container 11 includes a plurality of holes 17. A plurality of ribs 37 are provided lengthwise and crosswise on a surface of bottom 11c to maintain the strength of bottom 11c. Bosses 15 in this embodiment are arranged at the four corners, respectively on the top side of the bottom 11c and bosses 15 in this embodiment are slightly further away from side walls 11a, 11b than in the first embodiment. Bosses 15 are preferably located at intersecting points of ribs 37 for added strength. Recesses 14h are wholly contained within bottom 14c. Instead of two recesses 14g in supports 14f as in the first embodiment, four recesses 14g support four corresponding feet 12a.

Figure 13:
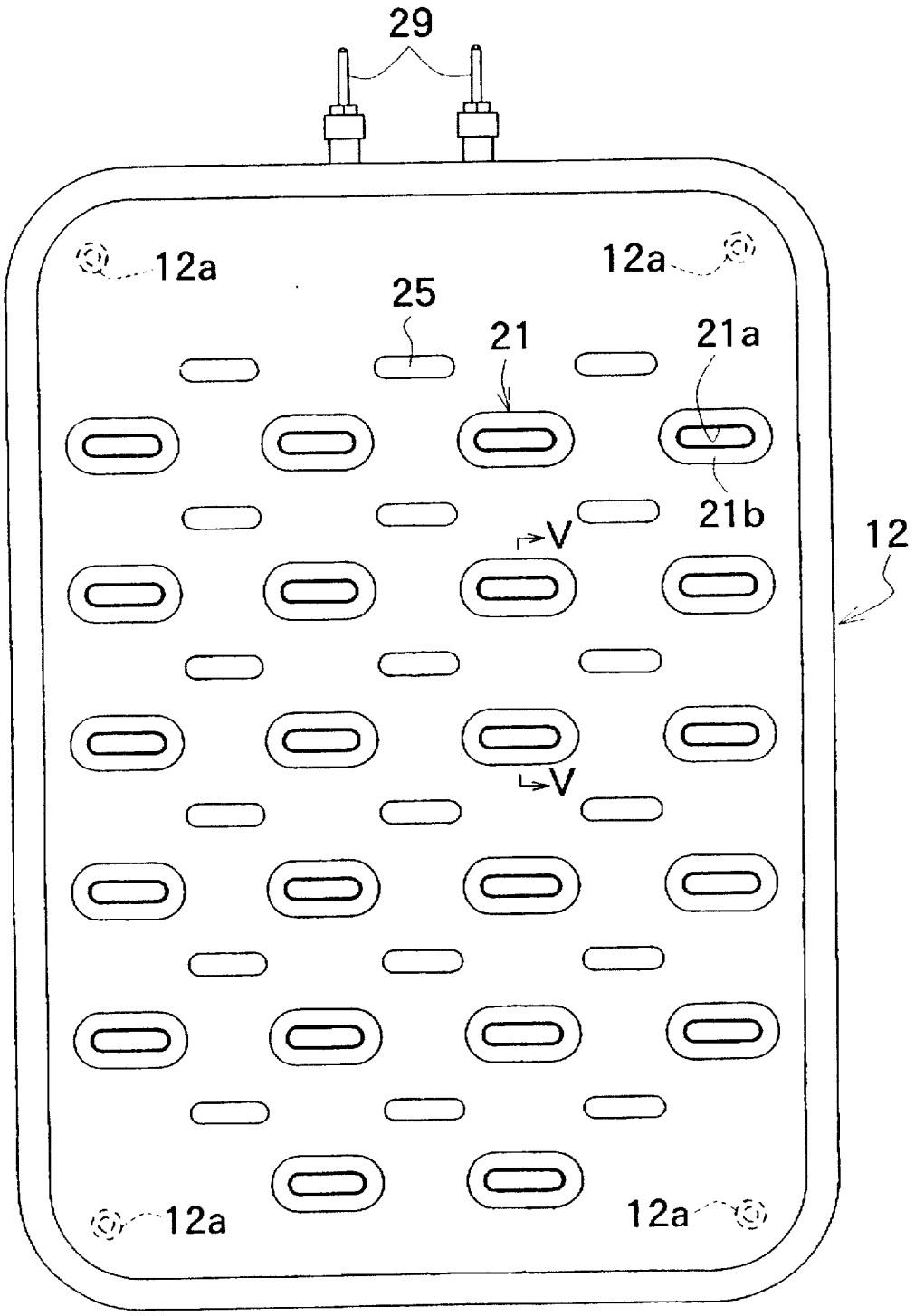
FIG. 13 is a top plan view of a cooking plate used in a cooking apparatus according to the second embodiment.
Figure 14:
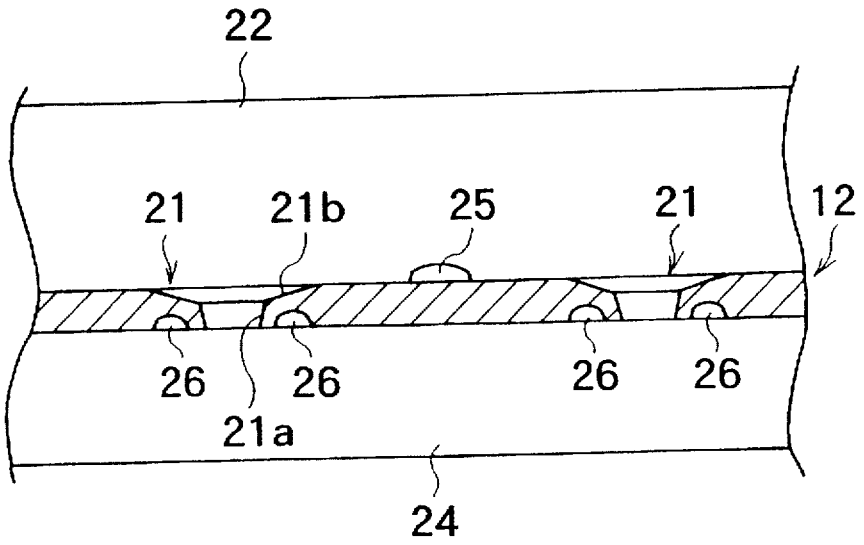
FIG. 14 is a vertical cross-sectional view along the V—V line in FIG. 13.

Referring to FIGS. 13–14, drip holes 21 in the second embodiment have a cross-section that differs from the cross-section of drip holes 21 in the first embodiment. An upper face 21b of drip hole 21 is gently inclined to aid cleaning while a lower face 21a is steeply inclined to aid dripping.

Referring to FIGS. 16–19, socket 28 in the second embodiment includes two bosses 28h projecting outward on outer sides of side plate portions 28d. Attachment opening 19 includes recesses 19b for receiving bosses 28h. A side portion 18b of apron 18 extends into attachment opening 19. A plurality of connecting portions 38 bridge and connect apron 18 and side wall 11b on either side of attachment opening 19. Connecting portions 38 include guide members 39, which appear folded in an L-shape when viewed from the bottom. Guide member 39 includes a first side plate portion 39a extending from connecting portion 38 to socket 28 and a second side plate portion 39b extending from a tip of first side plate portion 39a to attachment opening 19a.

When cooking plate 12 is fitted into receiving pan 14, socket 28 fits through attachment opening 19a of container 11. Interconnecting bosses 28h with recesses 19b adds stability to the fitted arrangement of cooking plate 12, receiving pan 14, and container 11. When socket 28 is inserted into attachment opening 19, upper ends of bosses 28h move toward attachment opening 19a while sliding on an inclined face of second side plate portion 39b. Accordingly, socket 28 fits into attachment opening 19a by moving socket 28 in a direction from an inside to an outside of container 11, thereby moving a tip of socket 28 into contact with side plate portion 18b of apron 18 and fitting bosses 28 into recesses 19b.

Figure 15:
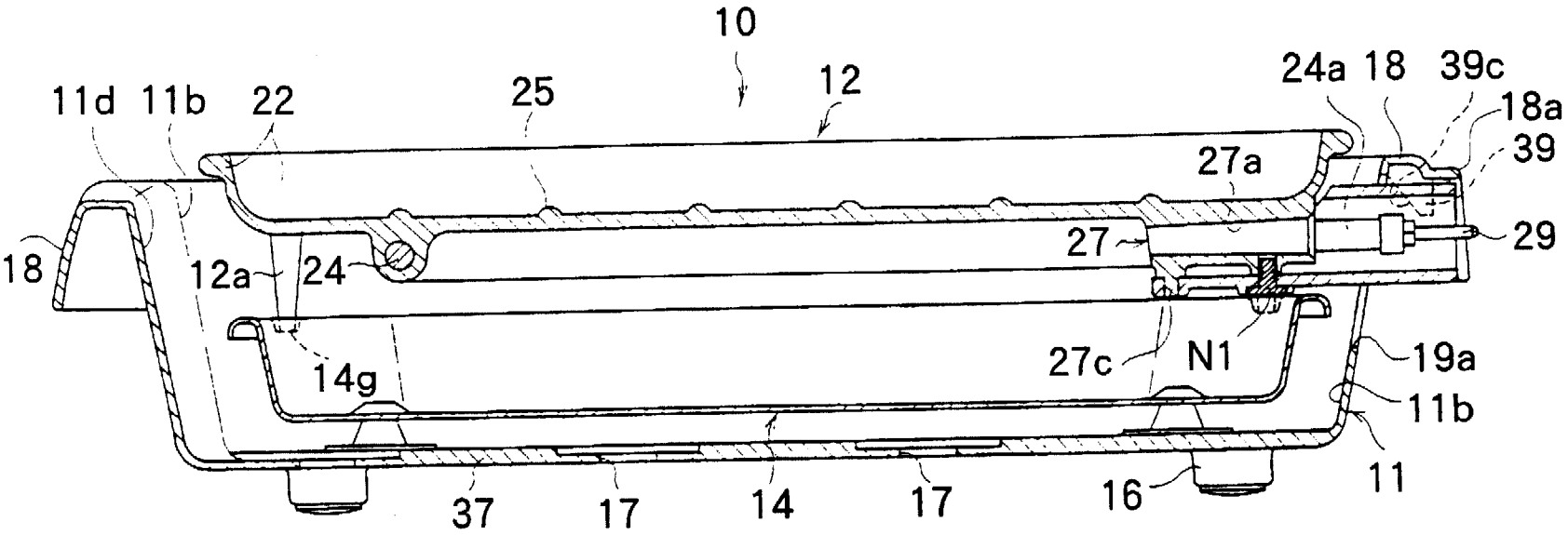
FIG. 15 is a cross-sectional view showing the assembled cooking plate, receiving pan, and container in the cooking apparatus according to the second embodiment.
Figure 16:
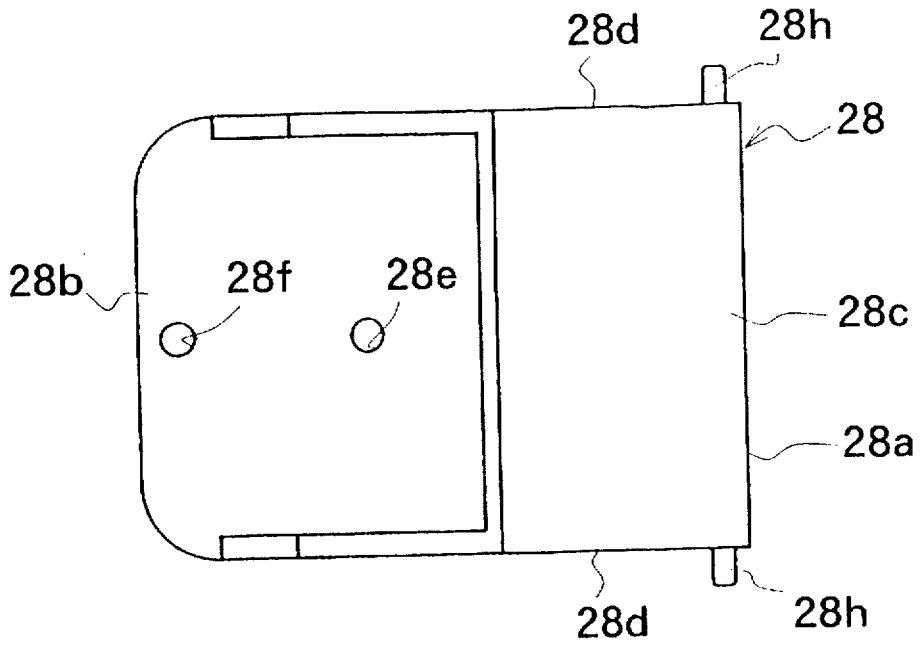
FIG. 16 is a plan view of a socket attached to the cooking plate according to the second embodiment.
Figure 17:
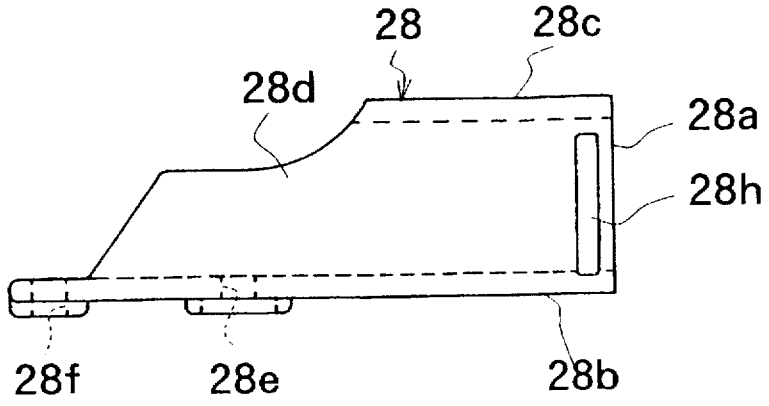
FIG. 17 is a side view of the socket attached to the cooking plate according to the second embodiment.
Figure 19:
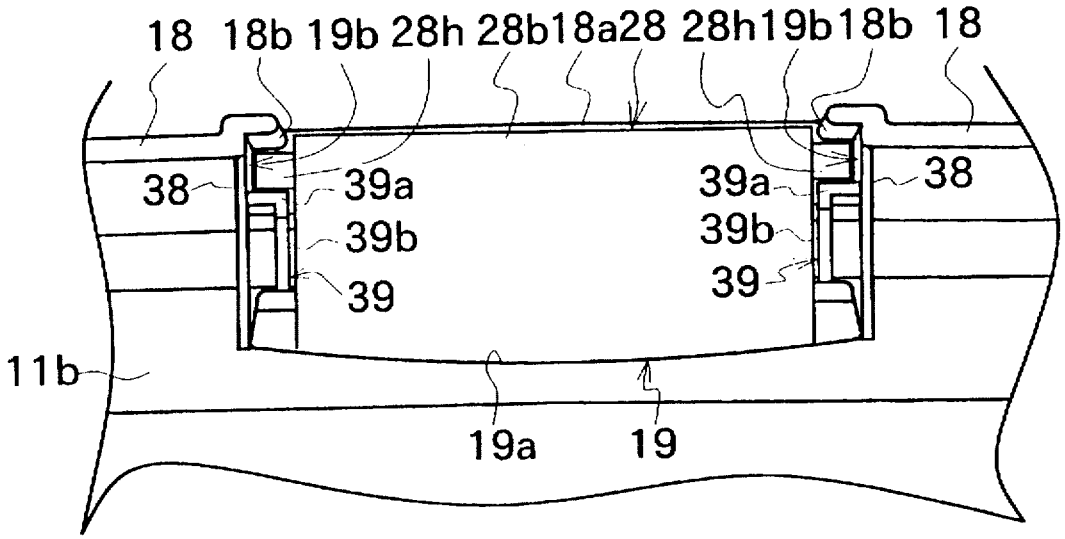
FIG. 19 is an enlarged bottom view of an attachment opening according to the second embodiment.
Figure 20:
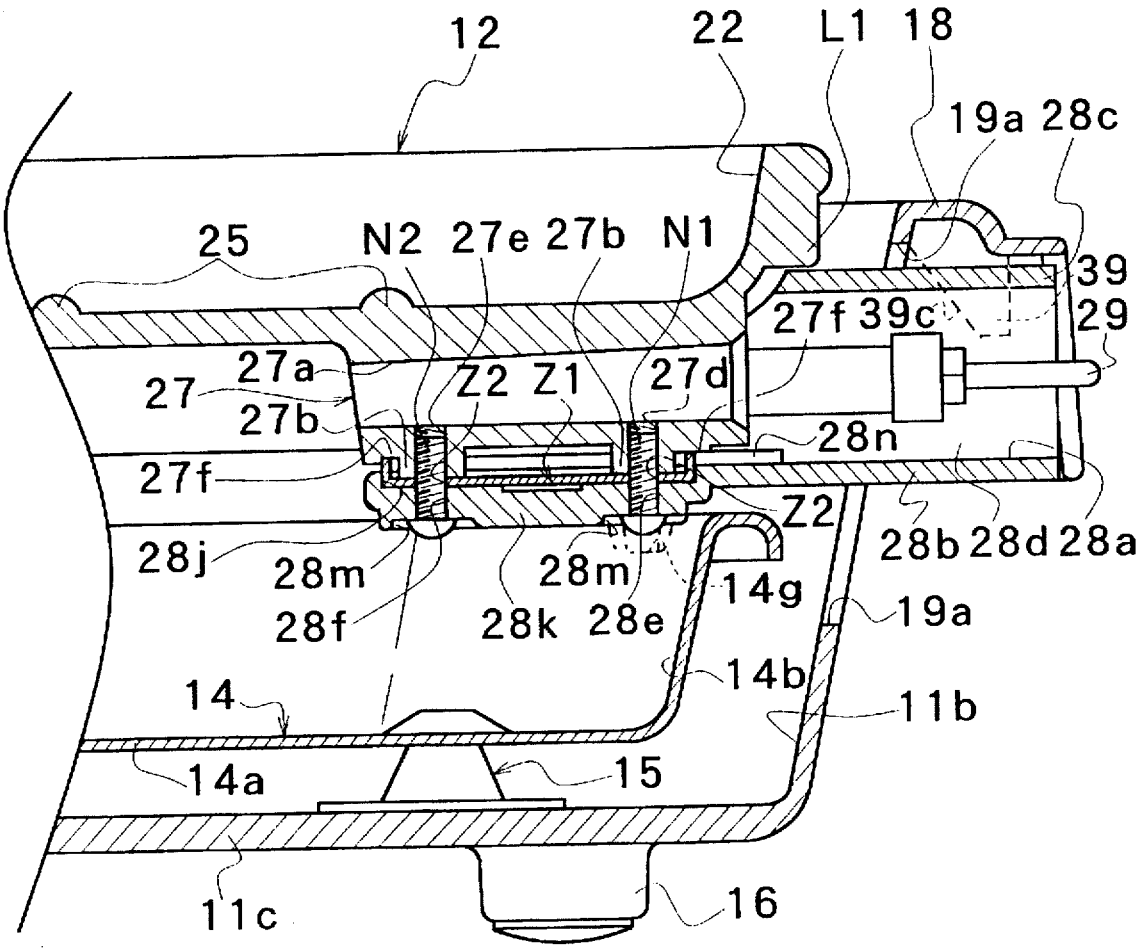
FIG. 20 is an enlarged cross-sectional view of a socket attached to a cooking plate according to a third embodiment.
Figure 21:
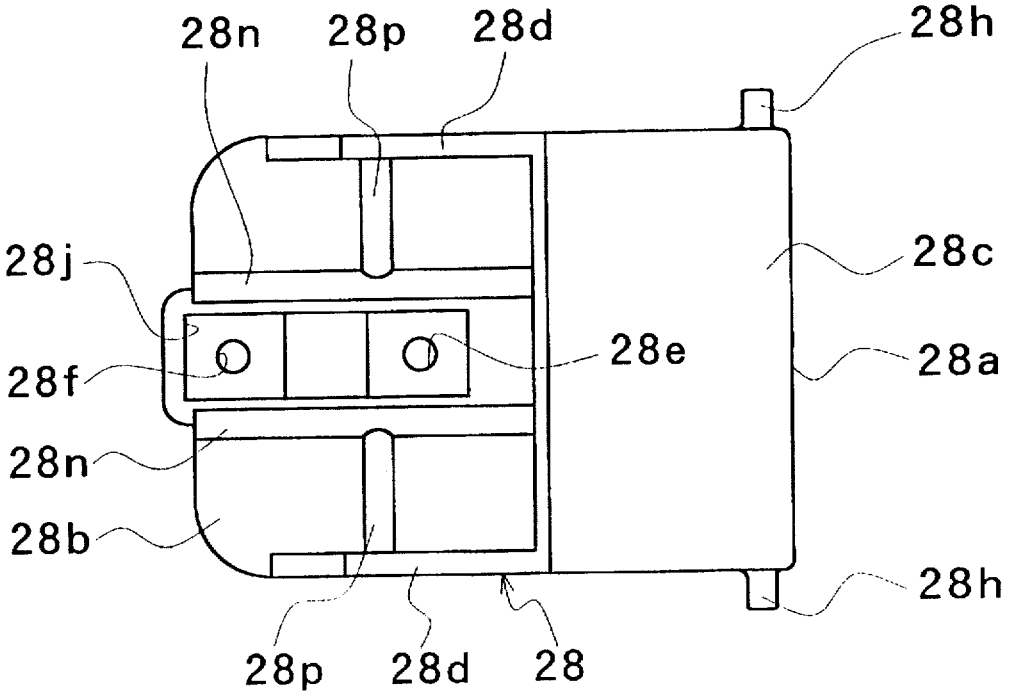
FIG. 21 is a plan view of the socket attached to the cooking plate according to the third embodiment.
Figure 22:
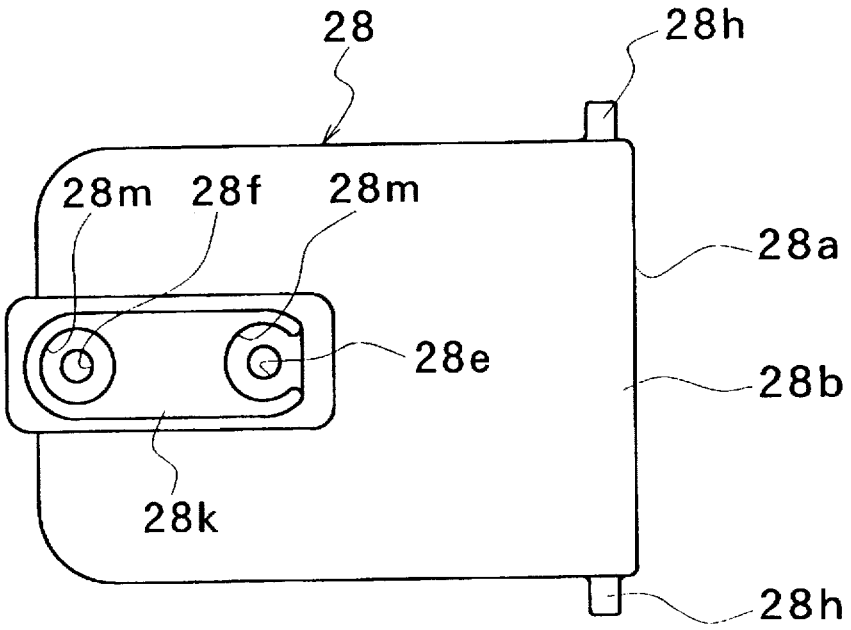
FIG. 22 is a bottom view of the socket attached to a cooking plate according to the third embodiment.
Figure 23:
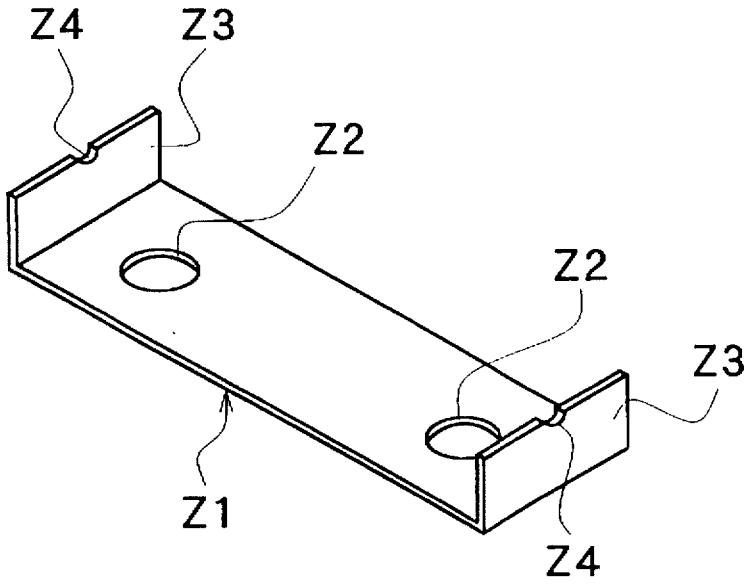
FIG. 23 is a perspective view of a bracket attached to the socket in FIG. 21.
Figure 25:
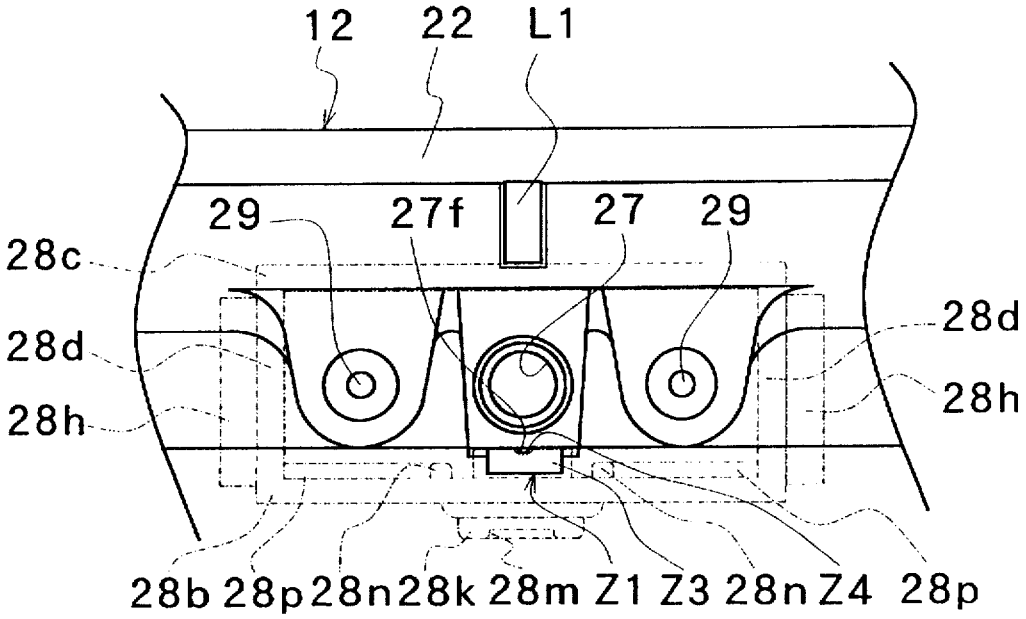
FIG. 25 is a fragmentary enlarged side view of the cooking plate in FIG. 24.
Figure 24:
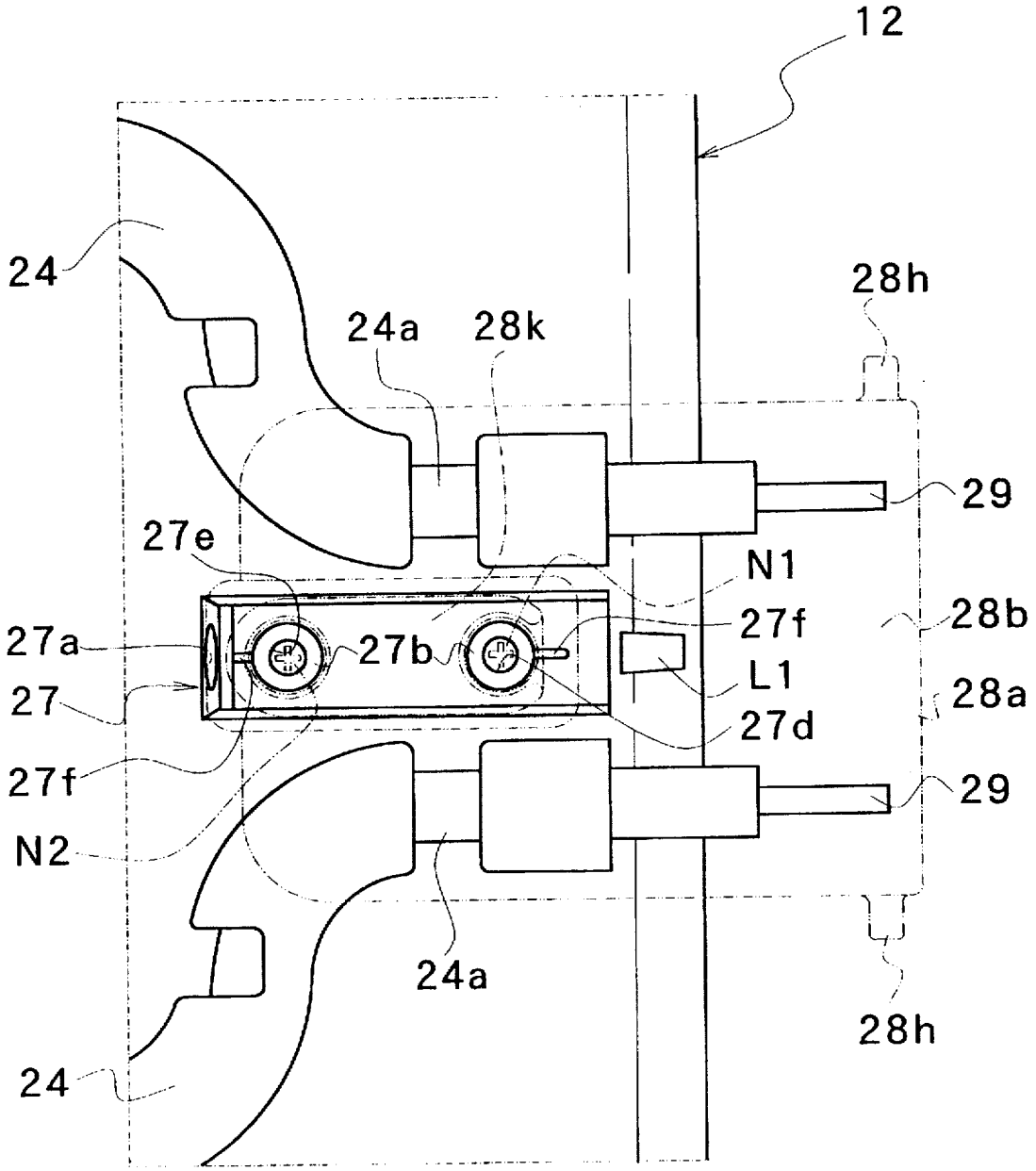
FIG. 24 is a fragmentary enlarged bottom of the cooking plate according to the third embodiment.
Figure 26:
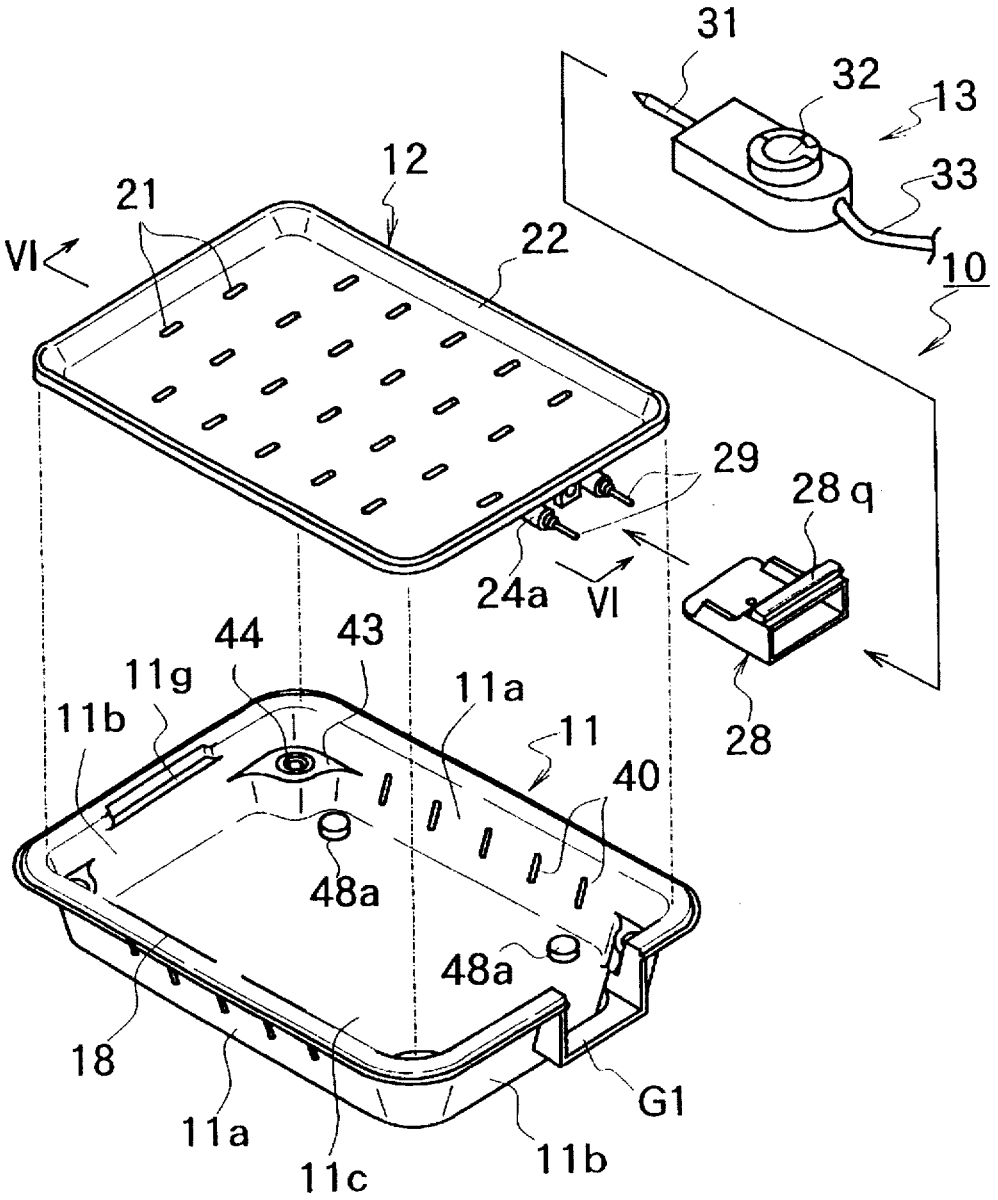
FIG. 26 is an exploded perspective view of a cooking apparatus according to a fourth embodiment.
Figure 27:
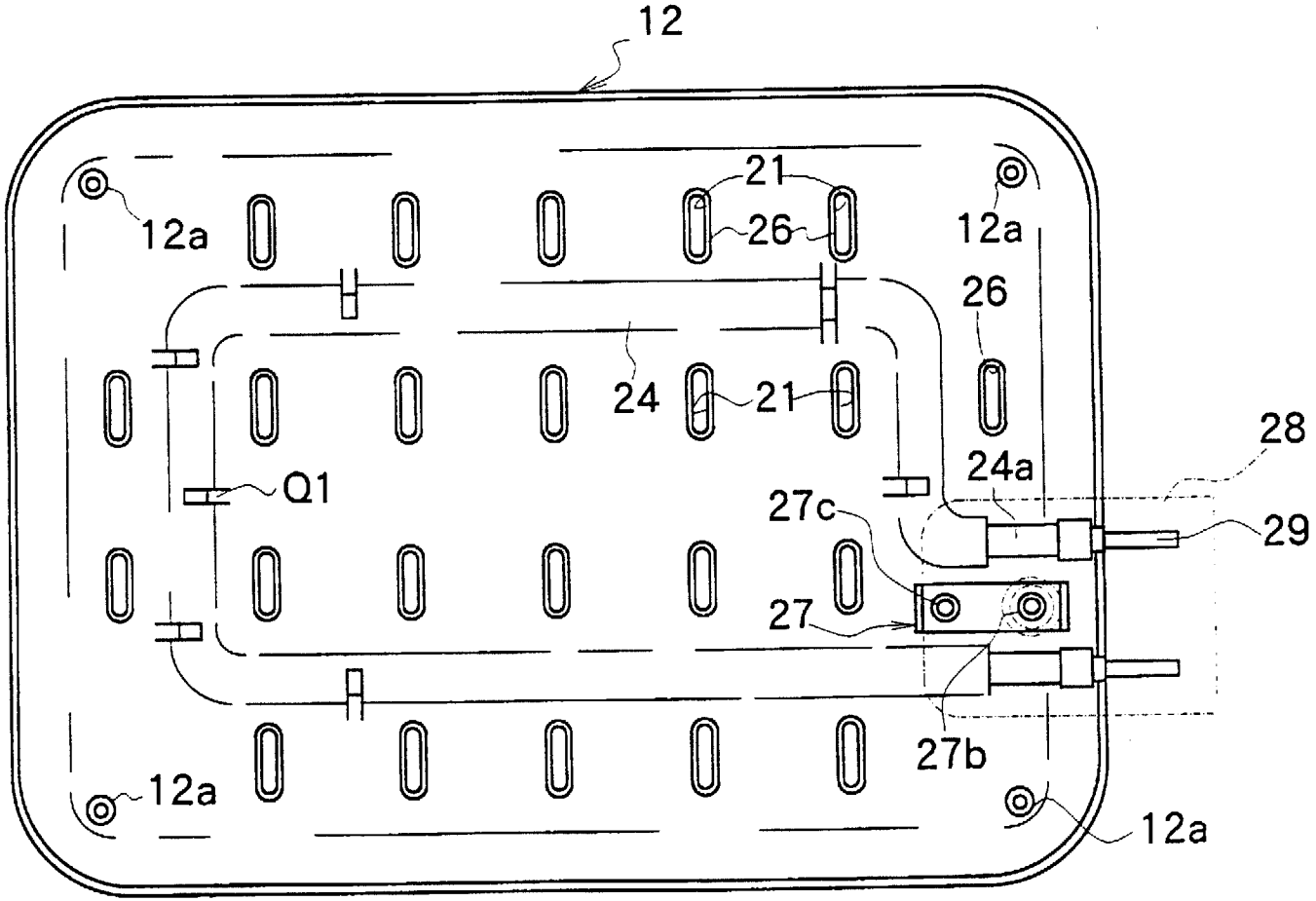
FIG. 27 is a bottom view of a cooking plate used in the cooking apparatus of the fourth embodiment.
Figure 28:
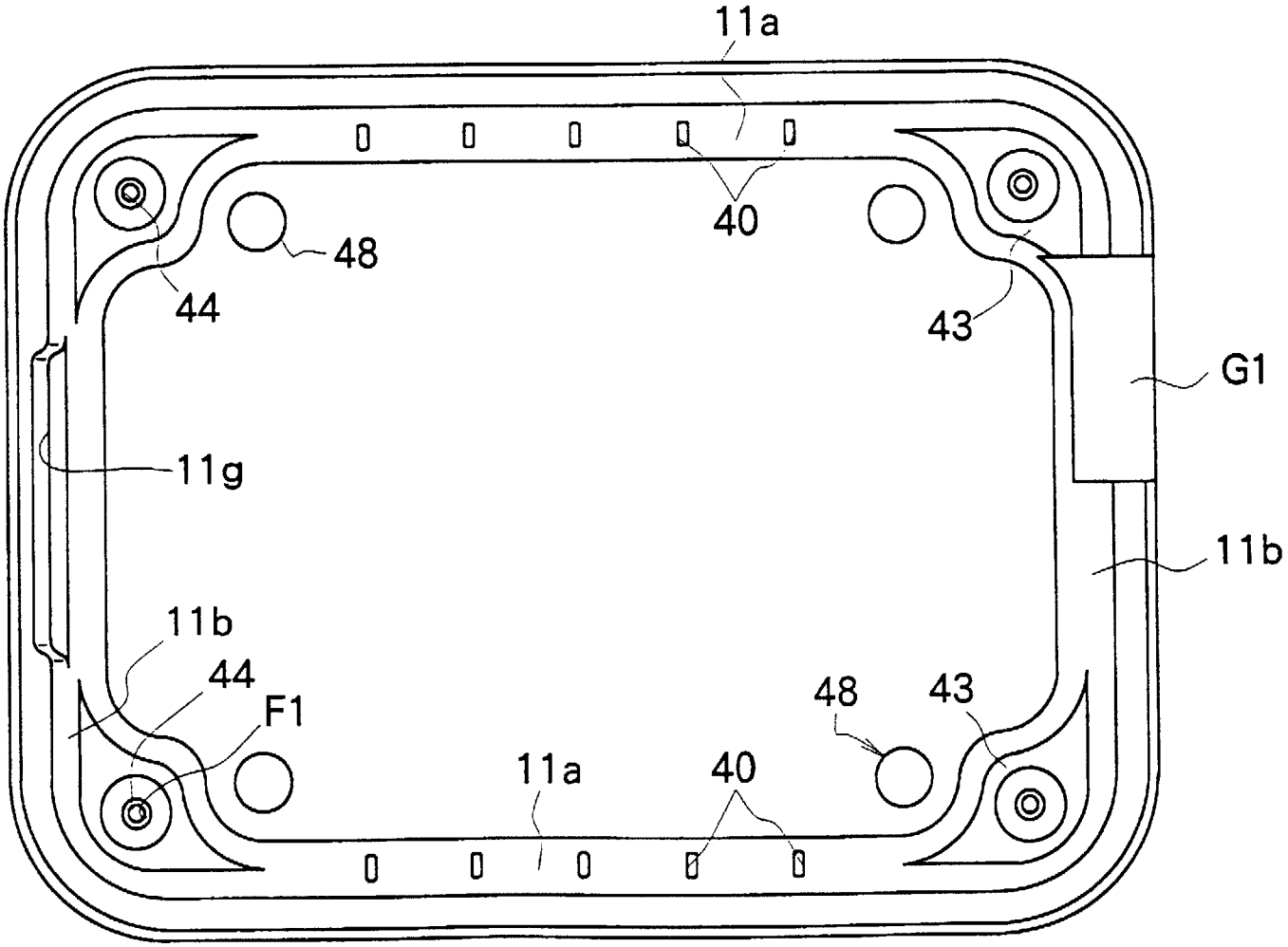
FIG. 28 is a top plan view of a container used in the cooking apparatus of the fourth embodiment.
Figure 29:
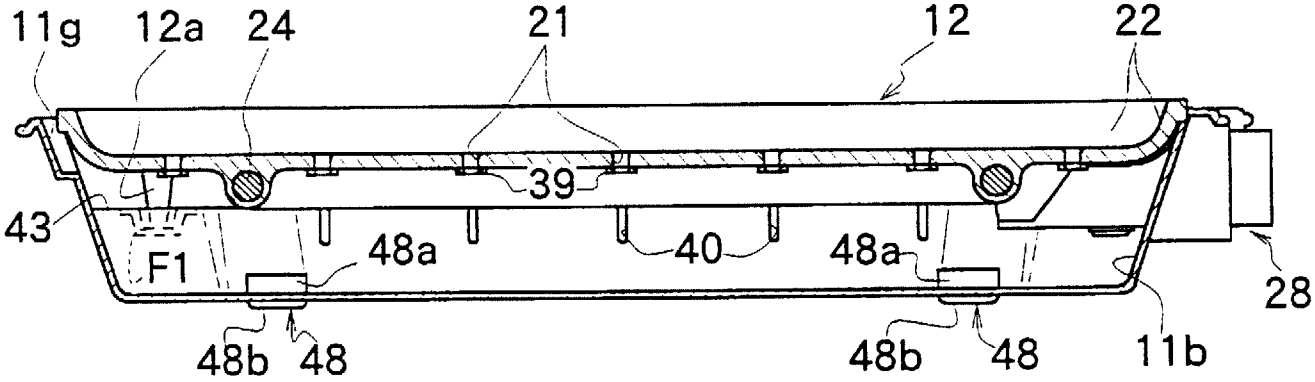
FIG. 29 is a cross-sectional view showing the assembled cooking apparatus according to the fourth embodiment.
Figure 30:
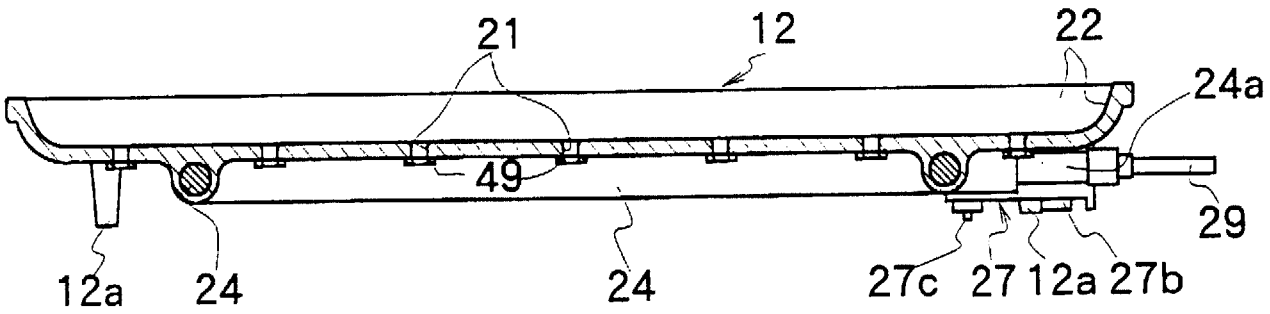
FIG. 30 is a vertical cross-sectional view along the VI—VI line in FIG. 26.
Figure 31:
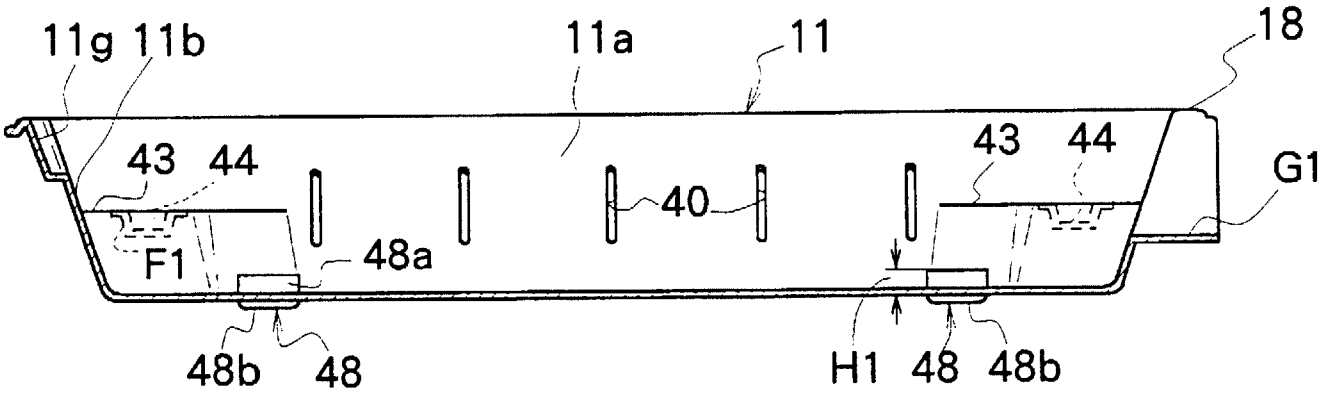
FIG. 31 is a cross-sectional view or the container used in the cooking apparatus according to the fourth embodiment.

Referring to FIG. 15, a lower end of attachment opening 19a is spaced below socket 28 of cooking plate 12 thereby enabling the user to insert fingers to remove receiving pan 14 from container 11.

Referring to FIGS. 20 to 25, a third embodiment differs from the second embodiment in that a part of socket 28 is different from that of the second embodiment, and accordingly, so is a method for attaching socket 28 to the side of cooking plate 12. Portions which differ from the first and second embodiments are described in detail whereas description of similar portions is omitted.

On a top of bottom plate portion 28b of socket 28, a recess 28j parallel to attachment base 27 receives a rectangularly formed bracket Z1. Bracket Z1 includes two through holes Z2, Z2 corresponding with respective attachment holes 28e, 28f contained in recess 28j. Bracket Z1 includes a pair of bent portions Z3, Z3 at both ends in its longitudinal direction which contact and support attachment base 27. Each bent portion Z3 includes a notch 24 which engages a corresponding projection 27f in attachment base 27.

Attachment holes 28e, 28f are in a thick wall portion 28k on a bottom of bottom plate portion 28b of socket 28. Recesses 28m, in thick wall portion 28k, contain heads of screws N1, N2 which pass through attachment holes 28e, 28f. Lengthwise ribs 28n and crosswise ribs 28p on bottom plate portion 28b strengthen socket 28. Similar ribs (not shown) can be included on a lower surface of attachment base 27 to strengthen attachment base 27. Socket 28 is attached to attachment base 27 by screws N1, N2 screwed into attachment holes 28e, 28f in socket 28 and holes Z2, Z2 in attachment base 27. A projection L1, disposed on edge 22 of cooking plate 12 and aligned with attachment base 27, supports socket 28 during assembly when forcing socket 28 against cooking plate 12 while screwing in screws N1, N2.

Referring to FIGS. 26 to 31, a fourth embodiment of the present invention differs from the first embodiment mainly in the shape and function of container 11, with concomitant changes to the shapes of cooking plate 12 and socket 28. A recess G1 replaces attachment opening 19. This embodiment combines the functions of receiving pan 14 and container 11, with container 11 directly supporting cooking plate 12. This embodiment is less expensive to manufacture due to the omission of a separate receiving pan 14. Portions which differ from the first and second embodiments are described in detail whereas description of similar portions is omitted.

An indentation 11g in apron 18 on one short side wall 11b allows a user to grasp a corresponding edge of cooking plate 12. Recess G1 on the other short side wall 11b receives socket 28 of cooking plate 12. Cooking plate 12 is easily placed in and removed from container 11.

Socket 28 includes a projection 28q on top plate portion 28c. Socket 28 and projection 28q together fill recess G1 when cooking plate 12 is mounted in container 11.

Since, in this embodiment, container 11 receives dripping juices directly from cooking plate 12, no holes are formed in bottom 11c. Holes 40 in long side walls 11a ventilate container 11 and allow hot air to escape.

Cooking plate 12 includes four feet 12a. A support 43 at each of four inside corners of container 11 includes a recess 44 for receiving the corresponding foot 12a of cooking plate 12. Heat from heating element 24 is conducted to feet 12a through cooking plate 12, and from there to supports 43. To avoid excessive heat reaching side walls 11a, 11b and a surface supporting container 11, an inside wall of each hole 44 is filled with a heat-resistant resin, such as heat-resistant phenol resin F1.

A plurality of feet 48 for supporting container 11 are provided at various locations on bottom 11c, such as at the four corners of bottom 11c. Each foot 48 has a hollow projection 48a projecting upward a distance H1 from an upper surface of bottom 11c. An antiskid rubber member 48b forms the bottom of each foot 48. A top of hollow projection 48a serves as a marker indicating a recommended amount of water reservoired in container 11. A user can easily determine that water is up to a level even with the top of hollow projection 48a before cooking.

Recess G1 and attachment base 27 are off center to allow the user to grasp the edge 22 of cooking plate 12 avoiding socket 28 and terminals 24a. A projection 49 on a bottom of cooking plate 12 surrounds each drip hole 21. Each projection 49, similar in function to grooves 26 surrounding drip holes 21 in the first embodiment, prevents juices which enter drip holes 21 from spreading along the bottom of cooking plate 12. Projections 49 are optional, as are grooves 26 in the first embodiment.

This invention is not restricted to the embodiments described above and can be modified or altered in various ways. For example, the present invention can be adapted for use with a gas burner.

Having described the preferred embodiments of the invention with reference to the accompanying drawings, it is to be understood that the invention is not limited to those precise embodiments, and that various changes and modifications may be effected therein by one skilled in the art without departing from the scope or spirit of invention as defined in the appended claims.

What is claimed is:

1. A cooking apparatus, comprising:

a cooking plate;

means for heating said cooking plate;

a plurality of drip holes in said cooking plate;

each of said drip holes being individually surrounded by [one of a separate projection and] a separate groove on a bottom side of said cooking plate;

a first container disposed below said cooking plate for supporting said cooking plate and for receiving a fluid dripping through said drip holes; and a second container disposed below said first container for supporting said first container.

2. A cooking apparatus according to claim 1, wherein a size of said first container is at least as large as said cooking plate.

3. A cooking apparatus according to claim 1, further comprising a side wall of said second container having a curved portion for permitting a hand of a user to fit therein.

4. A cooking apparatus according to claim 1, wherein:

said second container has at least one hole through said container; and said at least one hole is on one of a bottom thereof and a side end thereof.

5. A cooking apparatus according to claim 1, wherein said means for heating comprises:

a heating element disposed on a bottom side of said cooking plate; and said heating element avoids said drip holes.

6. A cooking apparatus according to claim 1, wherein:

each of said drip holes has an upper portion and a lower portion; and a cross-section of each of said drip holes becoming narrower from said upper portion to said lower portion.

7. A cooking apparatus according to claim 1, further comprising:

an attachment opening formed at a part of a side wall of said second container for receiving a socket attached to a side of said cooking plate; and said socket permitting connection of a detachable control.

8. A cooking apparatus, comprising:

a cooking plate;

a heating element attached to said cooking plate for applying heat to said cooking plate;

a plurality of drip holes formed in said cooking plate;

each of said drip holes being individually surrounded by [one of a separate projection and] a separate groove on a bottom side of said cooking plate; and a container disposed below said cooking plate for supporting said cooking plate and for receiving a fluid dripping through said drip holes.

9. A cooking apparatus according to claim 8, further comprising:

a socket attached to said cooking plate; and a recess in a side wall of said container for receiving said socket when said cooking plate is mounted in said container.

10. A cooking apparatus according to claim 8, wherein said drip holes are surrounded by one of projections and grooves on a bottom side of said cooking plate.

11. A cooking apparatus, comprising:

a cooking plate having a plurality of drip holes therein;

a plurality of projections on an upper side of said cooking plate;

means for heating said cooking plate;

a plurality of legs on said cooking plate;

a socket attached to said cooking plate;

a first container disposed below said cooking plate;

said first container being substantially similar in shape and size to said cooking plate;

a side wall of said first container having a first curved portion for permitting a hand of a user to fit therein;

a plurality of supports on said first container;

said plurality of supports having a plurality of recesses for receiving said plurality of legs on said cooking plate;

a second container disposed below said first container;

said second container being substantially similar in shape and larger in size than said first container;

said second container having an attachment opening for receiving said socket;

a side wall of said second container having a second curved portion for permitting said hand of said user to fit therein;

a plurality of bosses in said second container having a plurality of heat-resistant tips for supporting said first container; and at least one ventilating hole in said second container.

12. A cooking apparatus, comprising:

a cooking plate having a plurality of drip holes therein;

an upper face of each drip hole being gently inclined;

a lower face of each drip hole being steeply inclined;

means for heating said cooking plate;

a plurality of projections on an upper side of said cooking plate;

a plurality of legs on said cooking plate;

a socket attached to said cooking plate;

a first container disposed below said cooking plate;

said first container being substantially similar in shape and size to said cooking plate;

a side wall of said first container having a first curved portion for permitting a hand of a user to fit therein;

a plurality of supports on said first container;

said plurality of supports having a plurality of recesses for receiving said plurality of legs on said cooking plate;

a second container disposed below said first container;

said second container being substantially similar in shape and larger in size than said first container;

said second container having an attachment opening for receiving said socket;

said attachment opening having a plurality of recesses;

said socket having a plurality of bosses for interlocking with said plurality of recesses in said attachment opening;

a side wall of said second container having a second curved portion for permitting said hand of said user to fit therein;

a plurality of ribs on a surface of said second container;

a plurality of bosses in said second container having a plurality of heat-resistant tips for supporting said first container; and at least one ventilating hole in said second container.

13. A cooking apparatus, comprising:

a cooking plate having a plurality of drip holes;

a plurality of ridges surrounding said drip holes;

means for heating said cooking plate;

a socket attached to said cooking plate;

a plurality of legs on said cooking plate;

a one-piece container disposed under said cooking plate;

said container having a container wall and a container bottom;

a plurality of supports on said container bottom;

a plurality of recesses in said plurality of supports for receiving said plurality of legs of said cooking plate;

a heat-resistant synthetic resin in each of said recesses;

said container wall having an attachment opening for receiving said socket;

a plurality of feet on an underside of said container bottom; and at least one ventilating hole in said container wall.

14. A cooking apparatus, comprising:

a cooking plate having a plurality of drip holes therein;

a plurality of projections on an upper side of said cooking plate;

means for heating said cooking plate;

a plurality of legs on said cooking plate;

a socket attached to said cooking plate;

a first container disposed below said cooking plate;

a plurality of supports on said first container;

said plurality of supports having a plurality of recesses for receiving said plurality of legs on said cooking plate;

a second container disposed below said first container;

said second container having an attachment opening for receiving said socket;

a side wall of said second container having a curved portion for permitting a hand of a user to fit therein; and at least one ventilating hole in said second container.

15. A cooking apparatus, comprising:

a cooking plate having a plurality of drip holes therein;

an upper face of each drip hole being gently inclined;

a lower face of each drip hole being steeply inclined;

means for heating said cooking plate;

a plurality of projections on an upper side of said cooking plate;

a plurality of legs on said cooking plate;

a socket attached to said cooking plate;

a first container disposed below said cooking plate;

a plurality of supports on said first container;

said plurality of supports having a plurality of recesses for receiving said plurality of legs on said cooking plate;

a second container disposed below said first container;

said second container having an attachment opening for receiving said socket;

a side wall of said second container having a curved portion for permitting a hand of a user to fit therein;

a plurality of heat-resistant supporters in said second container for supporting said first container; and at least one ventilating hole in said second container.

16. A cooking apparatus according to claim 15, further comprising:

a plurality of legs on a bottom side of said cooking plate;

a plurality of supports on said first container; and said plurality of supports having a plurality of recesses for receiving said plurality of legs on said cooking plate.

* * * * *